(12) United States Patent
Lee et al.

(10) Patent No.: US 11,726,627 B2
(45) Date of Patent: Aug. 15, 2023

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Cheol-Hun Lee, Gyeonggi-do (KR); Do-Hyoung Kwon, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/675,104

(22) Filed: Feb. 18, 2022

(65) Prior Publication Data

US 2022/0269377 A1 Aug. 25, 2022

(30) Foreign Application Priority Data

Feb. 22, 2021 (KR) .................. 10-2021-0023658

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04112* (2013.01)

(58) Field of Classification Search
CPC ............ G06F 2203/04112; G06F 2203/04111
See application file for complete search history.

(56) References Cited

U.S. PATENT DOCUMENTS

| 2012/0127112 A1* | 5/2012 | Lu ..................... H03K 17/9622 345/174 |
| 2014/0055688 A1 | 2/2014 | Petcavich |
| 2021/0057490 A1* | 2/2021 | Choi ................... H01L 51/5246 |
| 2021/0149525 A1* | 5/2021 | Xu ......................... G06F 3/0446 |
| 2021/0208735 A1* | 7/2021 | Xie ........................ G06F 3/0446 |

FOREIGN PATENT DOCUMENTS

KR  10-2014-0092366 A  7/2014

* cited by examiner

*Primary Examiner* — Robin J Mishler
(74) *Attorney, Agent, or Firm* — Venable LLP

(57) ABSTRACT

The present disclosure relates to a touch sensor including: a first mesh electrode layer including: first unit patterns and a first intersecting point; a second mesh electrode layer including: second unit patterns and a second intersecting point; and an insulating layer positioned between the first mesh electrode layer and the second mesh electrode layer and provided with a contact hole, in which at least one of the first unit patterns includes: the second intersecting point in a planar direction, and at least one of the second unit patterns includes: the first intersecting point in the planar direction, and an image display device including the same.

11 Claims, 22 Drawing Sheets

TOUCH SENSOR AND IMAGE DISPLAY DEVICE INCLUDING THE SAME

CROSS-REFERENCE TO RELATED APPLICATION

This application claims priority to Korean Patent Application No. 10-2021-0023658, filed on Feb. 22, 2021, which is incorporated herein by reference in its entirety.

BACKGROUND

Field of the Disclosure

The present disclosure relates to a touch sensor and an image display device including the same.

Description of Related Art

As an information technology develops in recent years, various input devices are also being developed together. In addition, a personal computer, a portable transmittance device, and other personal information processing devices perform a text and graphic processing using various input devices such as a keyboard and a mouse.

However, with the rapid development of the information society, there is a problem in that it is difficult to efficiently drive a product using only the keyboard and the mouse, which serve as the conventional input device. Therefore, there increases a need for a device that is simple and has fewer erroneous operations, and that allows anyone to easily input information.

In addition, a technology related to the input device goes beyond the level of satisfying a general function, and interest is changing to high reliability, durability, innovation, design, and processing-related technology. In addition, to achieve this purpose, a touch sensor has been developed as an input device capable of easily inputting information such as texts and graphics.

The touch sensor is an input device that is added to or designed to be embedded in a display device such as a liquid crystal display (LCD), a plasma display panel (PDP), an organic light emitting diode (OLED), or an active matrix organic light emitting diode (AMOLED), and is a device that recognizes an object as an input signal when the object such as a finger or a touch pen is in contact with a screen. Recently, this touch sensor is mainly used in mobile devices such as a mobile phone and a portable multimedia player (PMP), or a smart phone, and is also used in many industrial fields such as a navigation device, a netbook, a notebook, a digital information device (DID), a desktop computer using a touch input support operating system, an Internet protocol TV (IPTV), a cutting-edge fighter, a tank, and an armored vehicle.

For example, as in Korean Patent Application Laid-Open No. 10-2014-0092366, a touch screen panel in which a touch sensor is coupled to various image display devices is being developed.

Meanwhile, the touch sensor may have a plurality of electrodes including a conductive material such as metal arranged on a substrate to recognize a signal by a user's touch. The conventional touch sensor has been manufactured in the method for forming a plurality of driving electrodes and sensing electrodes on the same layer, directly connecting any one electrode, and connecting the other electrode using a bridge electrode.

However, the touch sensor including the bridge electrode has a problem in that the bridge electrode is visually recognized by the user. To solve this problem, the touch sensor that does not use the bridge electrode has been developed by forming the driving electrode and the sensing electrode on different layers.

However, the touch sensor that does not use the bridge electrode may reduce the visibility due to the bridge electrode, but there is a problem in that an electrode pattern is visually recognized by the user due to a difference in optical refractive indexes because the driving electrode and the sensing electrode are formed on different layers, and there is a problem in that the thickness of an insulating layer formed between the electrode layers is increased to minimize a parasitic capacitance noise. In addition, there is a problem in that as the plurality of electrode patterns formed on different layers overlap each other, transmittance is lowered.

Therefore, there increases the demand for an ultra-thin type touch sensor, which implements the non-visibility of the electrode pattern, minimizes the parasitic capacitance noise, and minimizes the thickness of the insulating layer as well as solving the visibility problem of the bridge electrode even while preventing the reduction in the transmittance due to the electrode pattern.

The contents described in Description of Related Art are to help the understanding of the background of the present disclosure, and may include what is not previously known to those skilled in the art to which the present disclosure pertains.

RELATED ART DOCUMENT

Patent Document (Patent Document 1) Korean Patent Application Laid-Open No. 10-2014-0092366

SUMMARY

An object of the present disclosure is to provide a touch sensor with improved bridge electrode visibility.

In addition, another object of the present disclosure is to provide a touch sensor with improved electrode pattern visibility.

In addition, still another object of the present disclosure is to provide a touch sensor with improved parasitic capacitance noise characteristics.

In addition, yet another object of the present disclosure is to provide a touch sensor with improved electrode channel resistance characteristics.

In addition, still yet another object of the present disclosure is to provide a touch sensor with improved transmittance of an electrode pattern.

In addition, another further object of the present disclosure is to provide an ultra-thin type touch sensor by minimizing the thickness of an insulating layer.

In addition, still another further object of the present disclosure is to provide an image display device including the touch sensor.

The present disclosure relates to a touch sensor including; a first mesh electrode layer comprising: a first unit pattern and a first intersecting point; a second mesh electrode layer comprising: a second unit pattern and a second intersecting point; and an insulating layer positioned between the first mesh electrode layer and the second mesh electrode layer and provided with a contact hole, in which at least one of the first unit patterns includes: the second intersecting point in a planar direction, and at least one of the second unit patterns includes: the first intersecting point in the planar direction.

According to a first aspect of the present disclosure, an aperture ratio of at least one of the first mesh electrode layer and the second mesh electrode layer may be 65 to 85%.

According to a second aspect of the present disclosure, at least one of the first mesh electrode layer and the second mesh electrode layer may include: a transparent conductive electrode material.

According to a third aspect of the present disclosure, the transparent conductive electrode material may have the transmittance of 80% or more.

According to a fourth aspect of the present disclosure, the transparent conductive electrode material may include: one or more selected from a group consisting of indium tin oxide (ITO), indium zinc oxide (IZO), zinc oxide (ZnO), indium zinc tin oxide (IZTO), and cadmium tin oxide (CTO).

According to a fifth aspect of the present disclosure, the transparent conductive electrode material may have a stacked structure of transparent conductive oxide layer-metal layer-transparent conductive oxide layer.

According to a sixth aspect of the present disclosure, the metal layer may include: one or more selected from a group consisting of silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), and an alloy thereof.

According to a seventh aspect of the present disclosure, a pattern line width of at least one of the first mesh electrode layer and the second mesh electrode layer may be 10 to 100 µm.

According to an eighth aspect of the present disclosure, an area of a circle that uses, as a radius, a distance from the second intersecting point comprised in the first unit pattern to the center portion of the first unit pattern may be 10% or less of an area of the first unit pattern in the planar direction.

According to a ninth aspect of the present disclosure, an area of a circle that uses, as a radius, a distance from the first intersecting point comprised in the second unit pattern to the center portion of the second unit pattern may be 10% or less of an area of the second unit pattern in the planar direction.

According to a tenth aspect of the present disclosure, the first mesh electrode layer may include: a first main electrode and a first auxiliary electrode formed to be spaced apart from the first main electrode; and the second mesh electrode layer may include: a second main electrode and a second auxiliary electrode formed to be spaced apart from the second main electrode.

According to an eleventh aspect of the present disclosure, the contact hole may be to electrically connect at least one of the first main electrode and the second auxiliary electrode opposite thereto; and the second main electrode and the first auxiliary electrode opposite thereto.

According to a twelfth aspect of the present disclosure, the contact hole may be formed on at least one point of a point where a first main electrode intersecting point and a second auxiliary electrode intersecting point opposite thereto overlap in the planar direction; and a point where a second main electrode intersecting point and a first auxiliary electrode intersecting point opposite thereto overlap in the planar direction.

According to a thirteenth aspect of the present disclosure, the first main electrode may include: a first connection part connecting the first main electrode in a row direction, and the second main electrode may include: a second connection part connecting the second main electrode in a column direction.

According to a fourteenth aspect of the present disclosure, the first mesh electrode layer may include: a first dummy electrode formed to be spaced apart from the first main electrode and the first auxiliary electrode, and the second mesh electrode layer may include: a second dummy electrode formed to be spaced apart from the second main electrode and the second auxiliary electrode.

In addition, the present disclosure relates to an image display device including: a display penal; and the touch sensor stacked on the display panel.

According to the touch sensor according to the present disclosure, it is possible to form the driving electrode and the sensing electrode on different layers without including the bridge electrode, thereby further improving the visibility characteristics by the bridge electrode compared to the conventional touch sensor.

In addition, according to the touch sensor according to the present disclosure, it is possible to reduce the difference in the optical refractive index between the electrodes using the microelectrode pattern in which the spatial frequency is arranged as the high frequency component, thereby further improving the electrode pattern visibility compared to the conventional touch sensor.

In addition, according to the touch sensor according to the present disclosure, it is possible to minimize the overlap between the electrodes, and to form the contact hole in the insulating layer, thereby further improving the parasitic capacitance noise characteristics compared to the conventional touch sensor.

In addition, according to the touch sensor according to the present disclosure, it is possible to form the contact hole in the insulating layer, thereby further improving the electrode channel resistance characteristics compared to the conventional touch sensor.

In addition, according to the touch sensor according to the present disclosure, since the electrode pattern includes the pattern of the mesh shape including the open pattern, it is possible to further improve the transmittance of the electrode pattern.

In addition, according to the touch sensor according to the present disclosure, it is possible to minimize the thickness of the insulating layer compared to the conventional touch sensor, thereby implementing the ultra-thin type touch sensor.

DETAILED DESCRIPTION

Figure 1A:
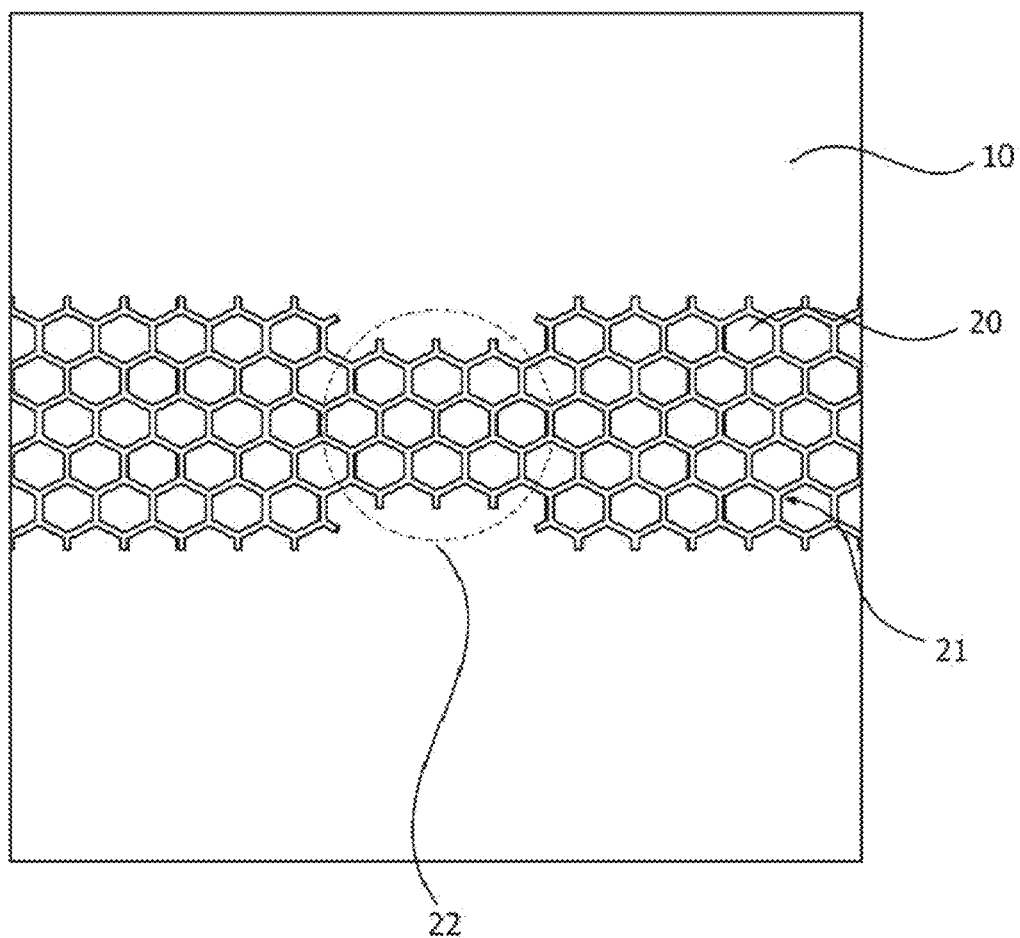
FIGS. 1A-1D are schematic plan diagrams showing a first mesh electrode layer according to an exemplary embodiment of the present disclosure.

The present disclosure relates to a touch sensor, which solves a visibility problem due to a bridge electrode by forming a first electrode layer and a second electrode layer on different layers with an insulating layer interposed therebetween, improves parasitic capacitance noise and electrode channel resistance characteristics by forming a contact hole in the insulating layer, and improves transmittance by including a mesh-shaped pattern in which the first electrode layer and/or the second electrode layer include an open pattern, and an image display device including the same.

More specifically, the present disclosure relates to the touch sensor including: a first mesh electrode layer including a first unit pattern(s) and a first intersecting point; a second mesh electrode layer including a second unit pattern(s) and a second intersecting point; and an insulating layer positioned between the first mesh electrode layer and the second mesh electrode layer and provided with a contact hole, in which at least one of the first unit patterns includes the second intersecting point in a planar direction, and at least one of the second unit patterns includes the first intersecting point in the planar direction, and the image display device including the same.

Hereinafter, exemplary embodiments of the present disclosure will be described in more detail with reference to the drawings. However, since the following drawings attached to the present specification show preferred exemplary embodiments of the present disclosure, and serve to further understand the technical spirit of the present disclosure together with the aforementioned content of the present disclosure, the present disclosure should not be interpreted as being limited only to the matters shown in these drawings.

The terms used in the present specification are to describe the exemplary embodiments, and are not intended to limit the present disclosure. In the present specification, the singular form also includes the plural form unless specifically stated otherwise in the phrase.

"Comprises" and/or "comprising" used in the specification are used as the meaning that does not preclude the presence or addition of one or more other components, steps, operations, and/or elements other than the mentioned components, steps, operations, and/or elements. The same components are denoted by the same reference numerals throughout the specification.

[below], [bottom], [under], [above], [top], and [over] that are spatially relative terms may be used to easily describe the correlation between one element or components and another element or components as shown in the drawings. Spatially relative terms should be understood as terms including different directions of the element during use or operation in addition to the directions shown in the drawings. For example, when the elements shown in the drawings are turned over, the element described as "below" or "under" another element may be placed "above" another element. Therefore, the exemplary term "below" may include both the bottom and top directions. The element may also be oriented in other directions, and therefore, the spatially relative terms may be interpreted depending upon the orientation.

A "planar direction" used in the present specification may be interpreted as a direction perpendicular to a first mesh electrode layer, a second mesh electrode layer, and/or an insulating layer, that is, a direction viewed from the user's side.

Touch Sensor

Figure 2A:
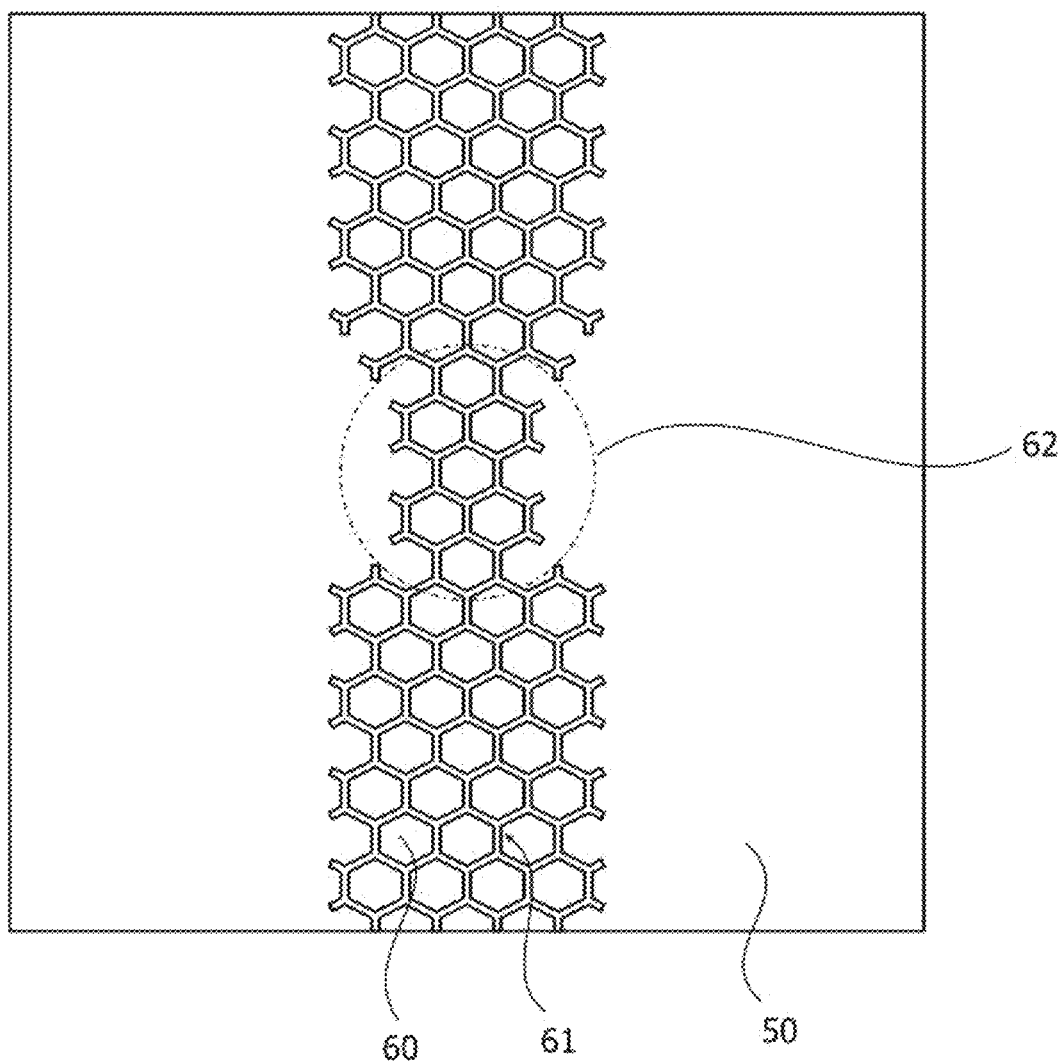
FIGS. 2A-2D are schematic plan diagrams showing a second mesh electrode layer according to the exemplary embodiment of the present disclosure.
Figure 2B:
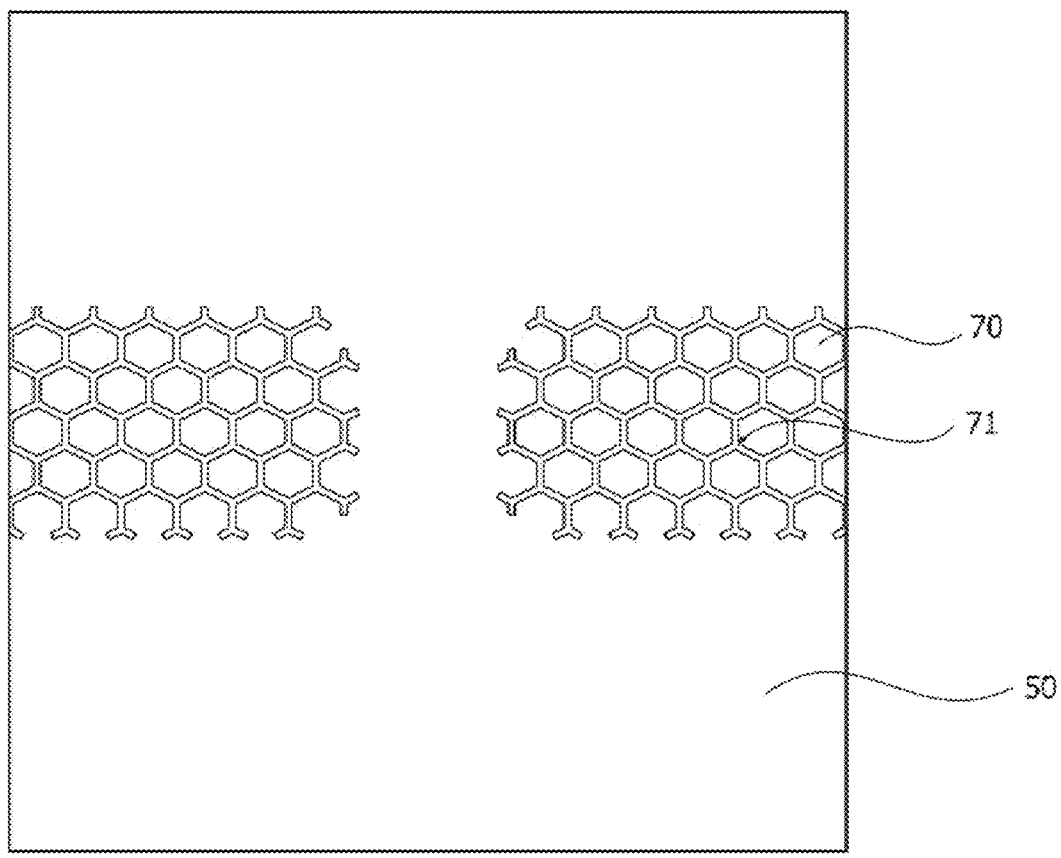
Figure 2C:
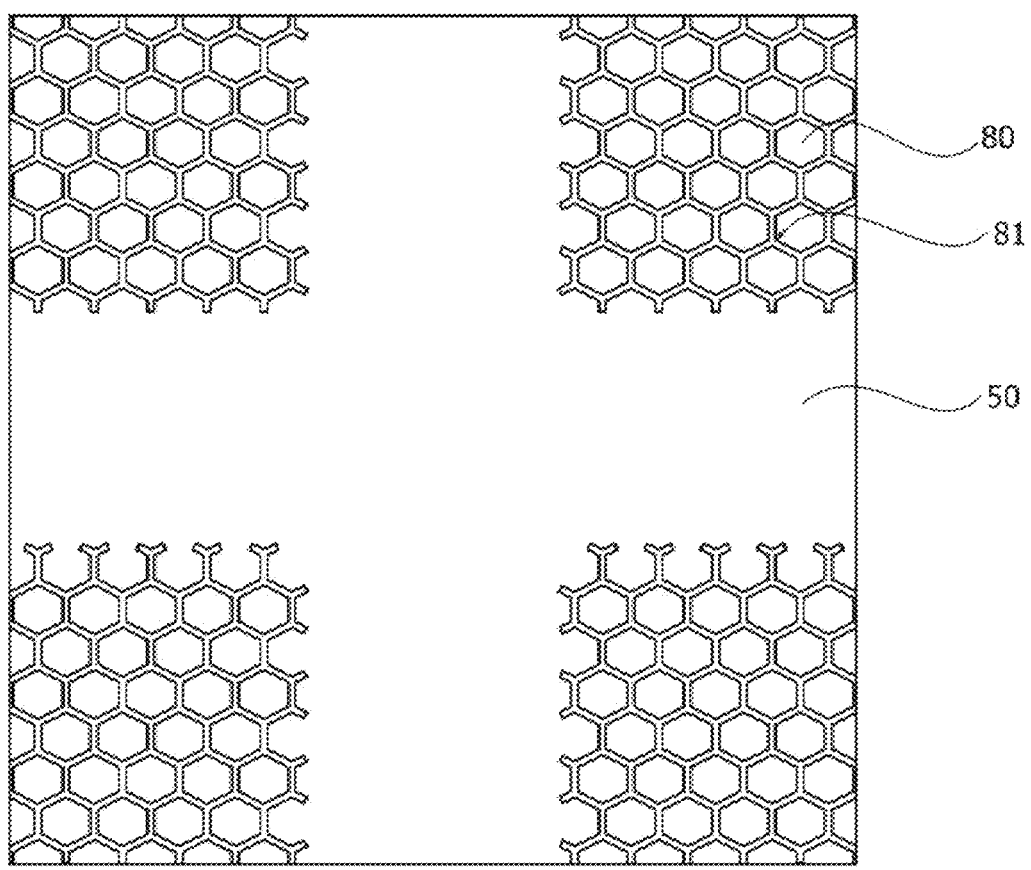
Figure 2D:
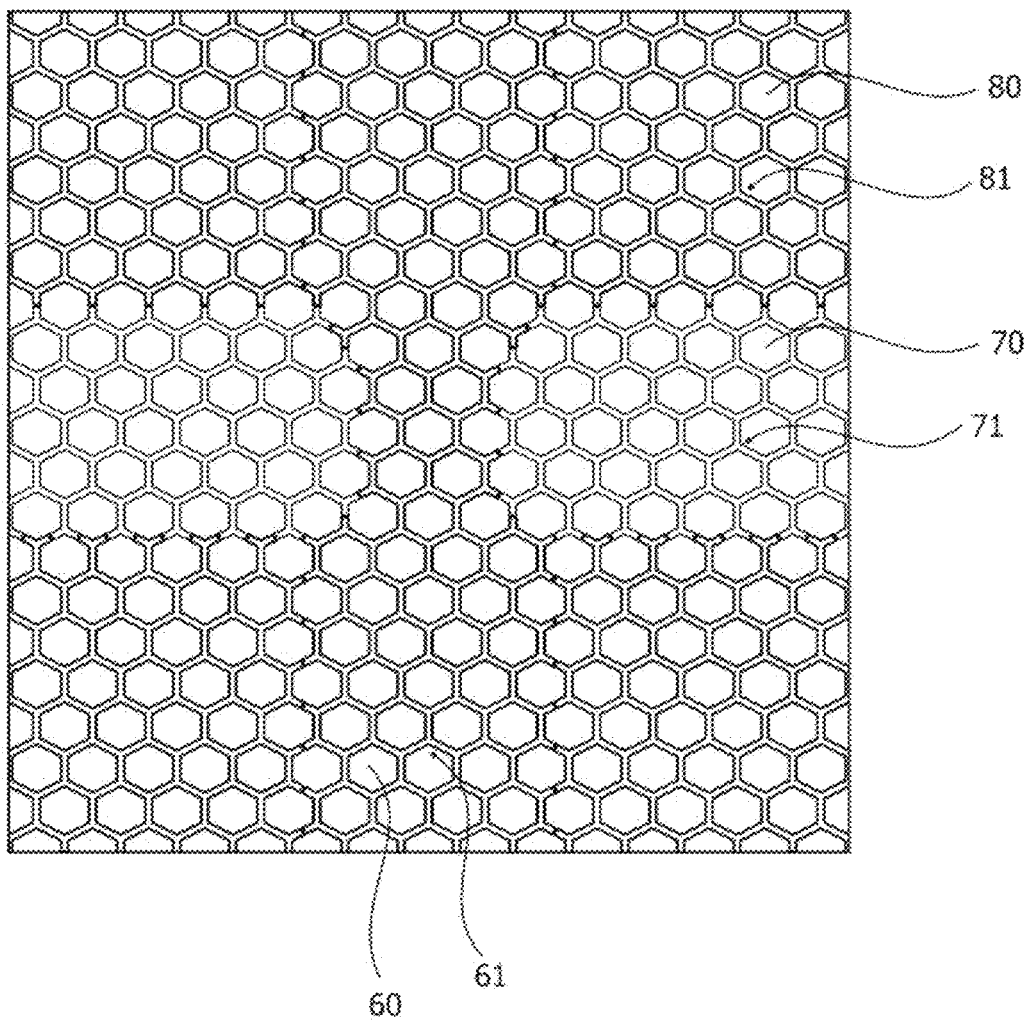
Figure 3:
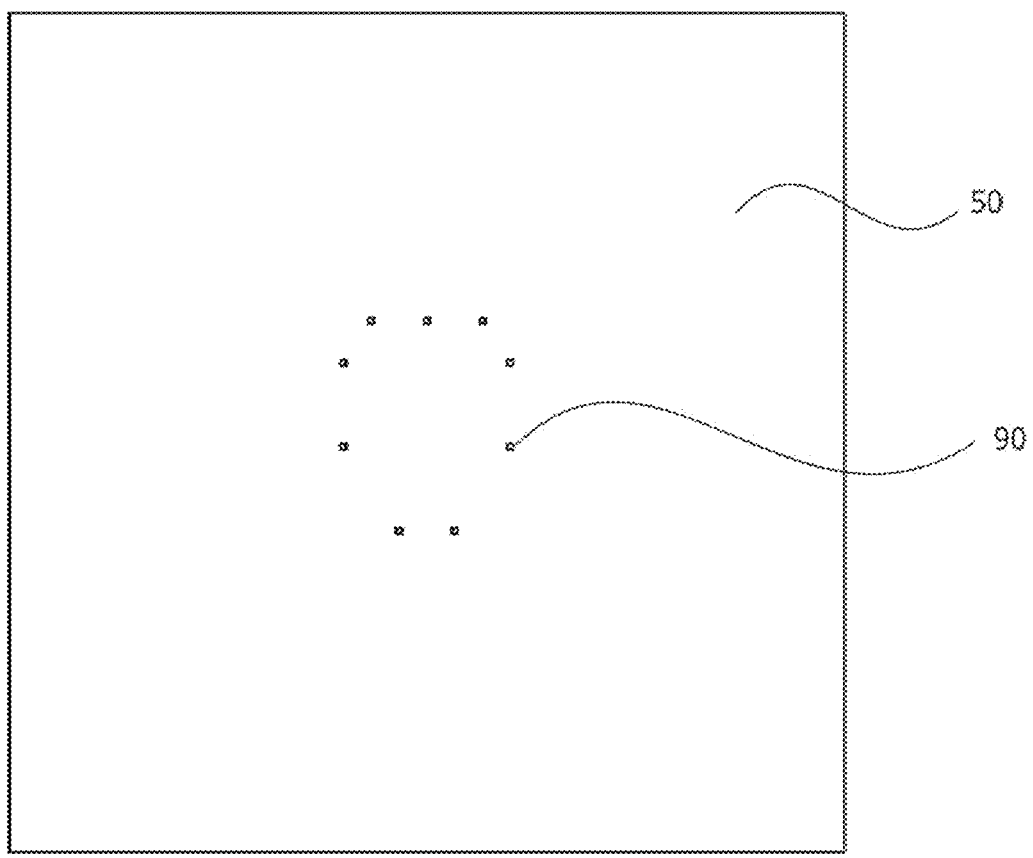
FIG. 3 is a schematic plan diagram showing an insulating layer having a contact hole formed therein according to the exemplary embodiment of the present disclosure.
Figure 4:
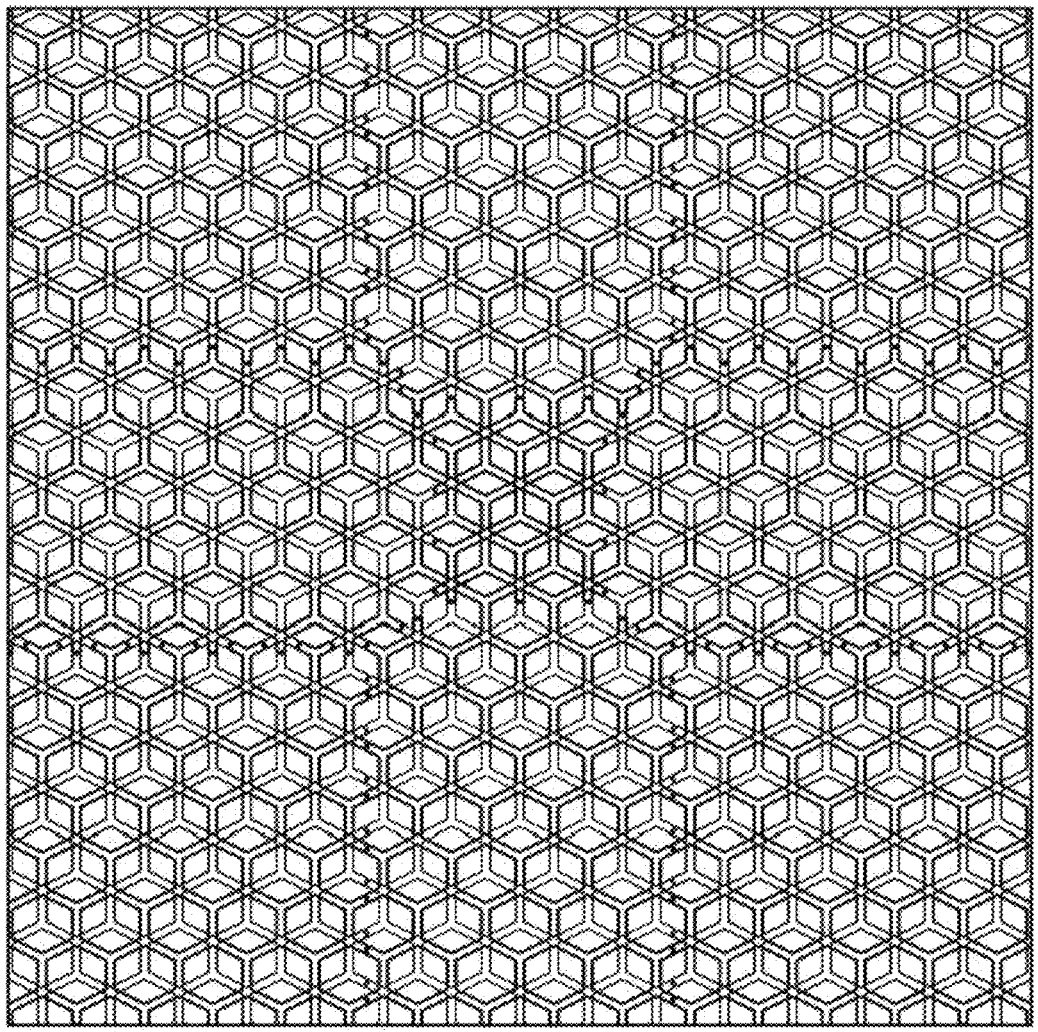
FIG. 4 is a schematic plan diagram showing a touch sensor according to the exemplary embodiment of the present disclosure.

FIG. 1 is schematic plan diagrams showing a first mesh electrode layer according to an exemplary embodiment of the present disclosure, FIG. 2 is schematic plan diagrams showing a second mesh electrode layer according to the exemplary embodiment of the present disclosure, FIG. 3 is a schematic plan diagram showing an insulating layer having a contact hole formed therein according to the exemplary embodiment of the present disclosure, and FIG. 4 is a schematic plan diagram showing a touch sensor according to the exemplary embodiment of the present disclosure.

Figure 6A:
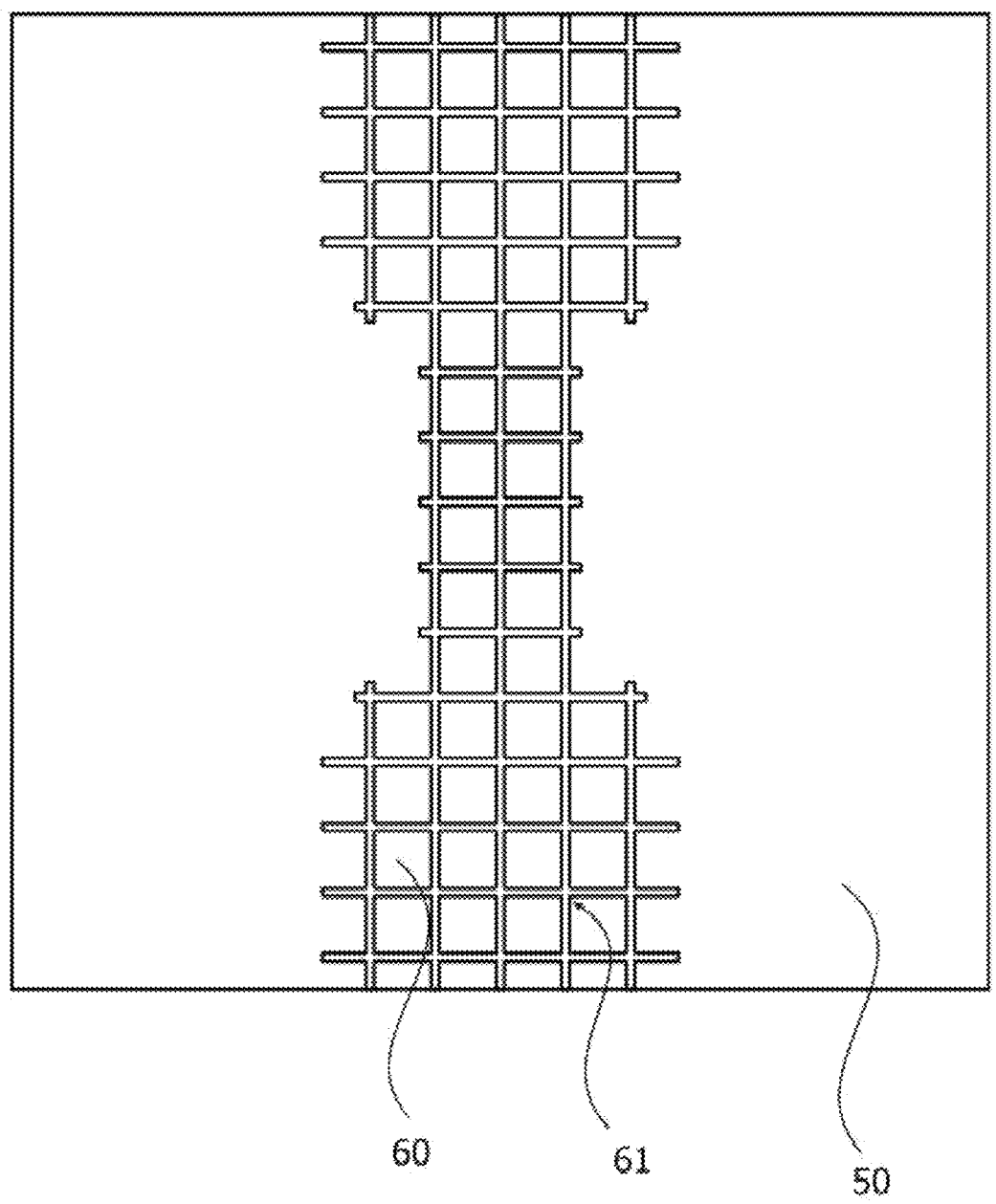
FIGS. 6A-6D are schematic plan diagrams showing a second mesh electrode layer according to another exemplary embodiment of the present disclosure.
Figure 6B:
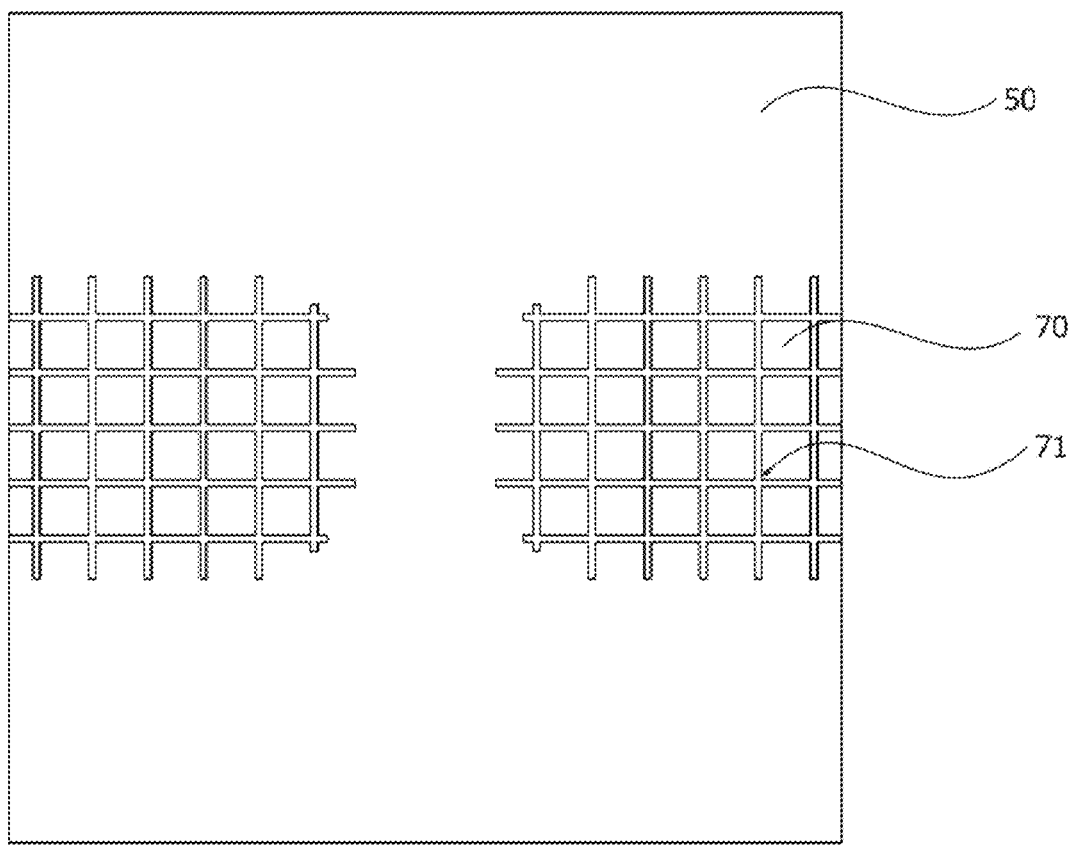
Figure 6C:
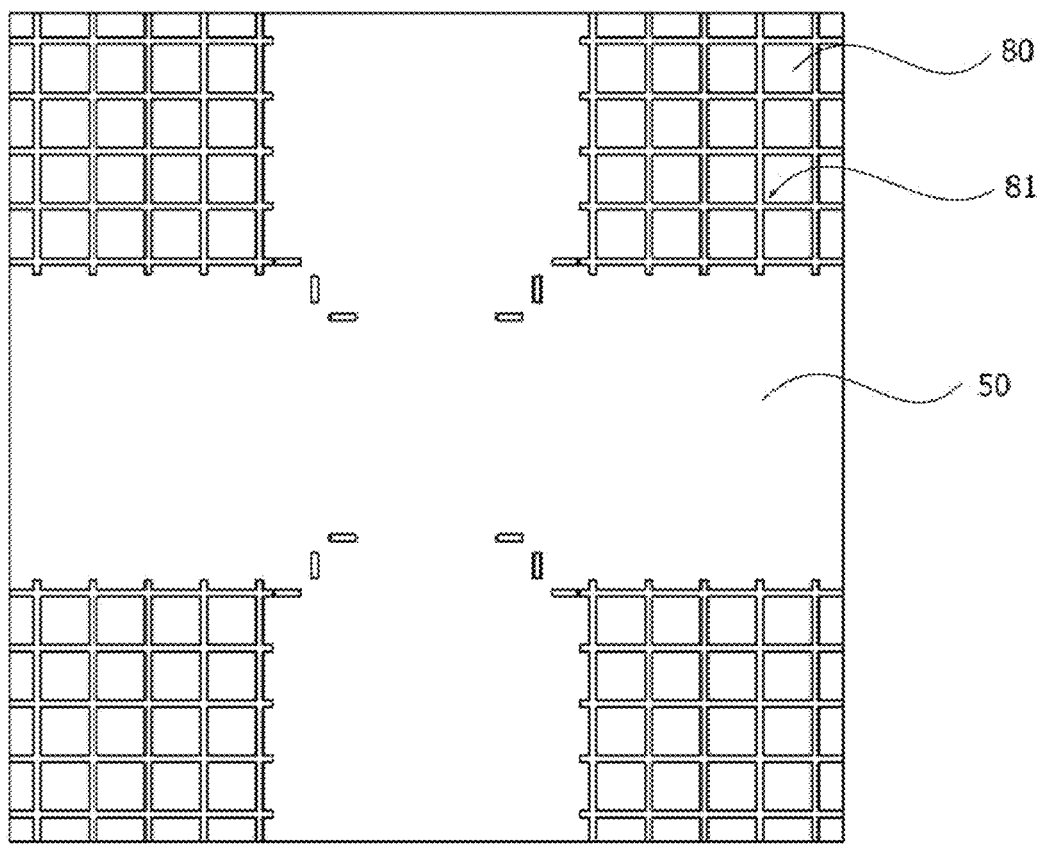
Figure 6D:
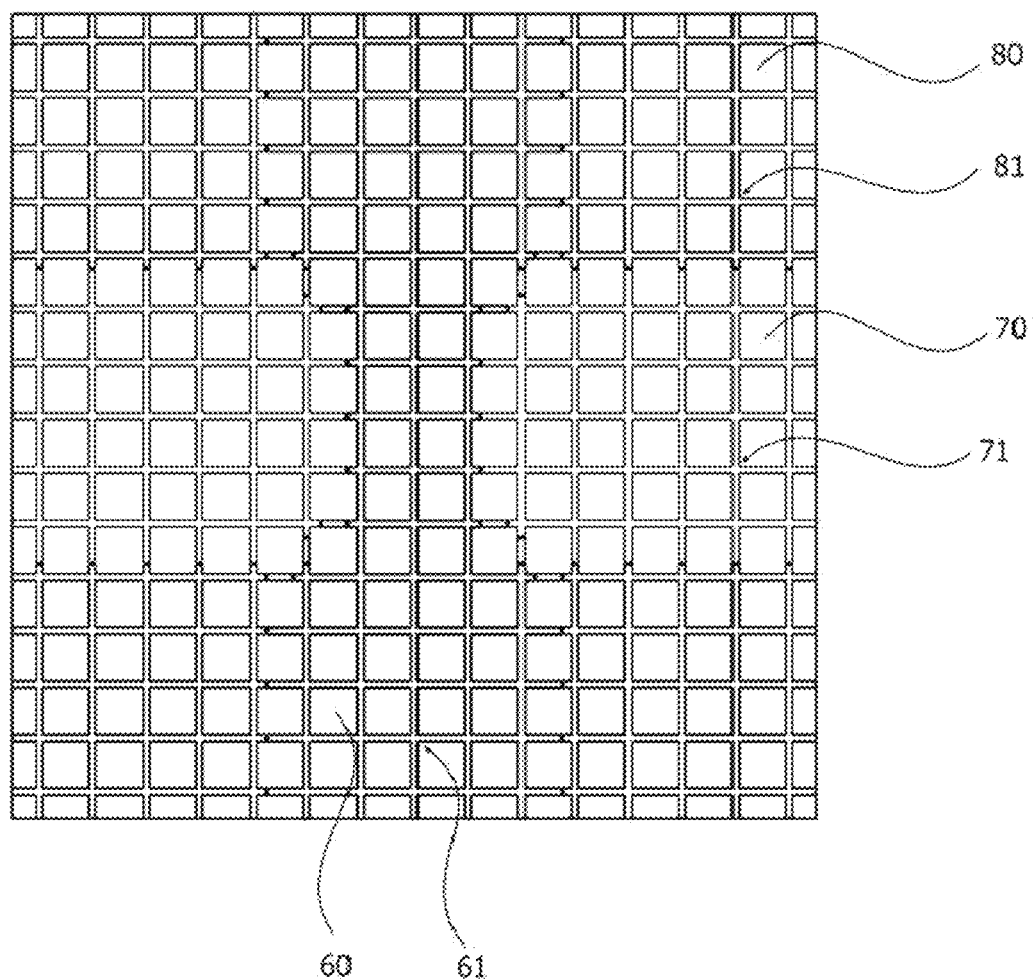
Figure 7:
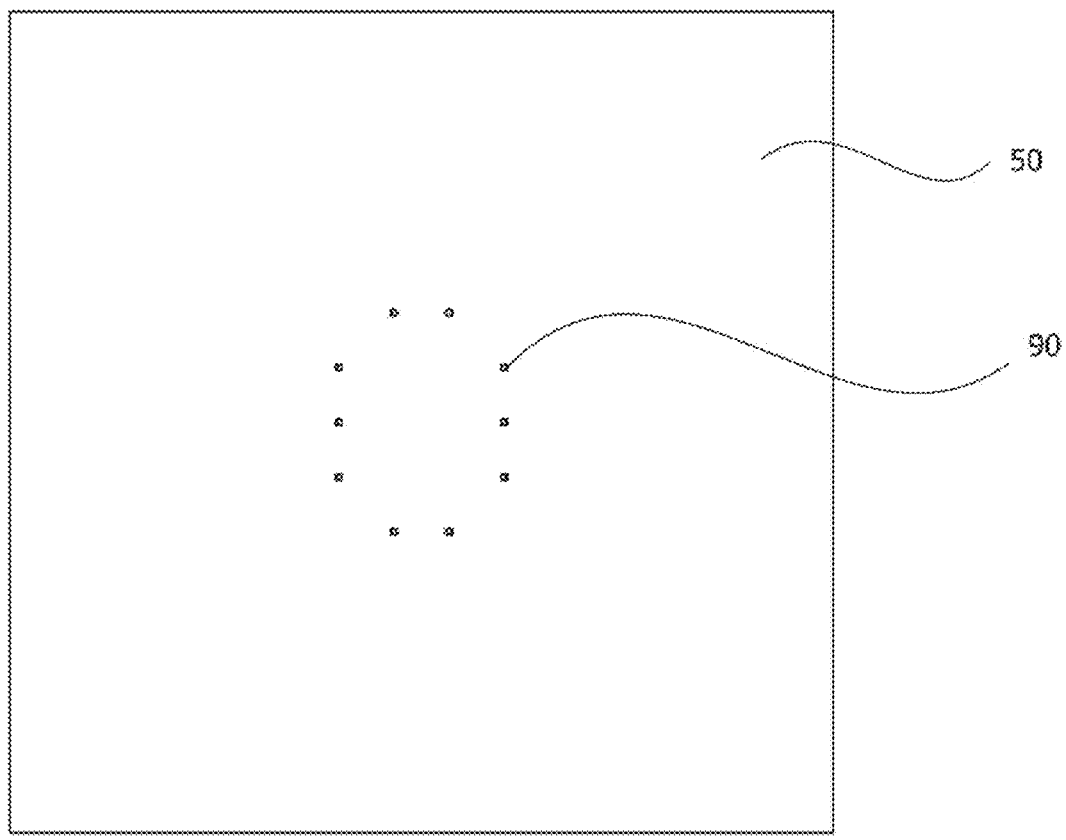
FIG. 7 is a schematic plan diagram showing an insulating layer having a contact hole formed therein according to another exemplary embodiment of the present disclosure.
Figure 8:
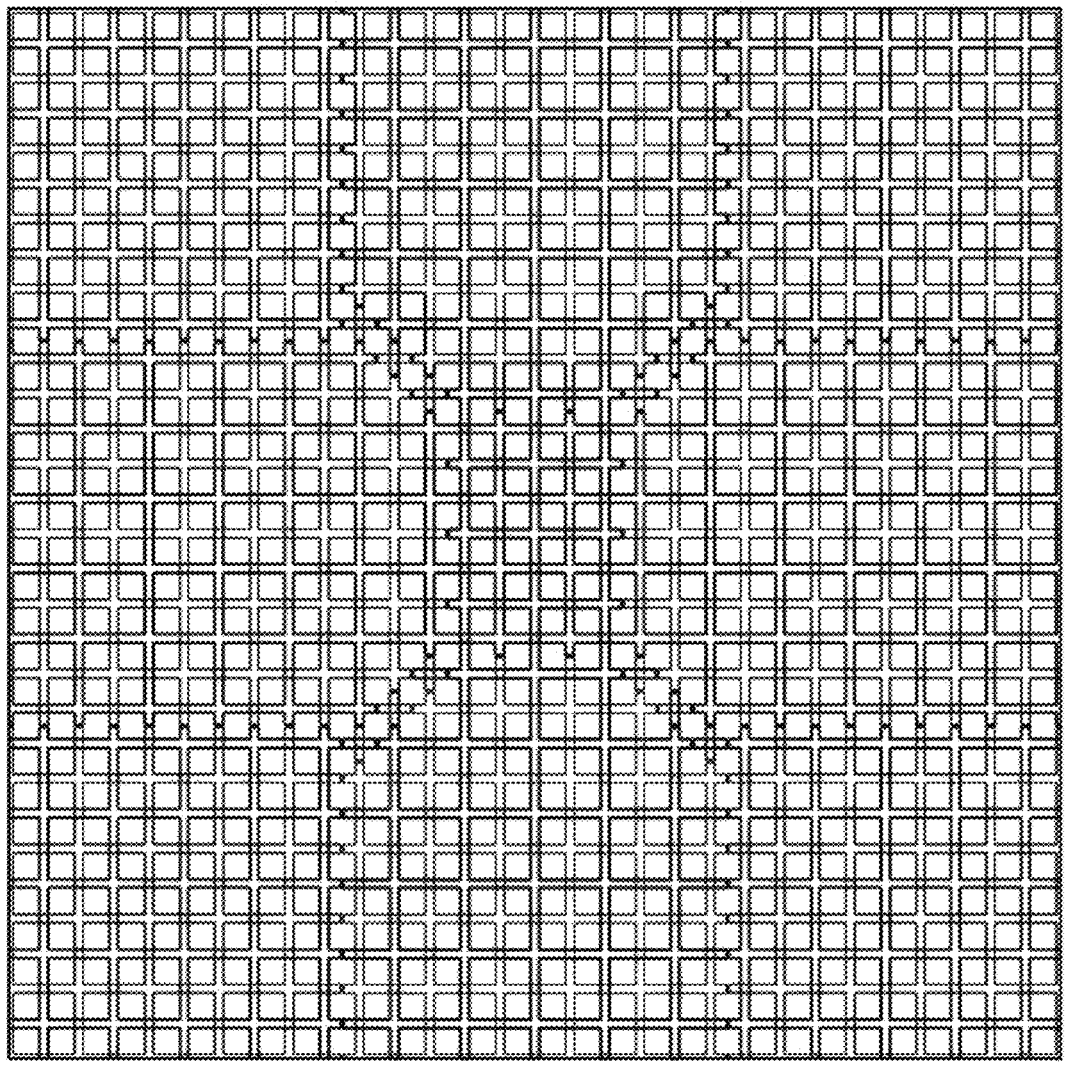
FIG. 8 is a schematic plan diagram showing a touch sensor according to another exemplary embodiment of the present disclosure.

FIG. 5 is schematic plan diagrams showing a first mesh electrode layer according to another exemplary embodiment of the present disclosure, FIG. 6 is schematic plan diagrams showing a second mesh electrode layer according to another exemplary embodiment of the present disclosure, FIG. 7 is a schematic plan diagram showing an insulating layer having a contact hole formed therein according to another exemplary embodiment of the present disclosure, and FIG. 8 is a schematic plan diagram showing a touch sensor according to another exemplary embodiment of the present disclosure.

Referring to FIGS. 1 to 8, a touch sensor according to the present disclosure may include: a first mesh electrode layer and a second mesh electrode layer provided on a base layer 10. The first mesh electrode layer and the second mesh electrode layer may be spaced apart from each other in a thickness direction with an interlayer insulating layer 50 interposed therebetween. The first mesh electrode layer and the second mesh electrode layer may be electrically connected by a contact hole 90 formed in a part of the insulating layer 50.

The base layer 10 is not especially limited as long as it serves as a base capable of structurally supporting the electrode layer, the insulating layer 50, etc., and may include a film-type base, etc. According to one or a plurality of exemplary embodiments, the base layer 10 may include: glass; polymer materials such as cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclic olefin copolymer (COC), polymethyl methacrylate (PMMA); and/or inorganic insulating materials such as silicon oxide, silicon nitride, silicon oxynitride, and metal oxide.

The layer or film member of an image display device may be provided as the base layer 10 of the touch sensor. According to one or a plurality of exemplary embodiments, an encapsulation layer or a passivation layer included in a display panel may be provided as the base layer 10.

The first mesh electrode layer includes: a first main electrode and a first auxiliary electrode. According to the exemplary embodiment, the first mesh electrode layer may be formed to include: a first main electrode intersecting point 21 defined by a first main electrode unit pattern 20 included in the first main electrode and the adjacent first main electrode unit pattern 20, and a first auxiliary electrode intersecting point 31 defined by a first auxiliary electrode unit pattern 30 included in the first auxiliary electrode and the adjacent first auxiliary electrode unit pattern 30. The first mesh electrode layer may be formed on an upper surface of the base layer 10. A configuration and structure of the first mesh electrode layer will be described later in more detail with reference to the drawings to be described later.

The insulating layer 50 may be formed on the base layer 10 to cover the first mesh electrode layer. The insulating layer 50 is not especially limited as long as it serves to electrically insulate the first mesh electrode layer and the second mesh electrode layer, and according to one or a plurality of exemplary embodiments, the insulating layer 50 may include: an organic insulating material such as an epoxy-based resin, an acrylic-based resin, a siloxane-based resin or a polyimide-based resin, and/or an inorganic insulating material such as silicon oxide or silicon nitride.

The second mesh electrode layer includes: a second main electrode and a second auxiliary electrode. According to the exemplary embodiment, the second mesh electrode layer may be formed to include: a second main electrode intersecting point 61 defined by a second main electrode unit pattern 60 included in the second main electrode and the adjacent second main electrode unit pattern 60, and a second auxiliary electrode intersecting point 71 defined by a second auxiliary electrode unit pattern 70 included in the second auxiliary electrode and the adjacent second auxiliary electrode unit pattern 70. The second mesh electrode layer may be formed on an upper surface of the insulating layer 50. A configuration and structure of the second mesh electrode layer will be described later in more detail with reference to the drawings to be described later.

The contact hole 90 may be formed in a part of the insulating layer 50 to electrically connect the first mesh electrode layer with the second mesh electrode layer, and specifically, may be to electrically connect at least one of the first main electrode and the second auxiliary electrode opposite thereto; and the second main electrode and the first auxiliary electrode opposite thereto. A configuration and structure of the contact hole will be described later in more detail with reference to the drawings to be described later.

According to the exemplary embodiment, the first mesh electrode layer and the second mesh electrode layer may be formed to include a transparent conductive electrode material. The transparent conductive electrode material is not especially limited as long as it is a material having light-transmitting property and electrical conductivity, but in terms of reducing the visibility of the electrode pattern and improving the brightness, the transmittance is preferably 80% or more. According to one or a plurality of exemplary embodiments, the transparent conductive electrode material may include: one or more selected from a group consisting of indium tin oxide (ITO), indium zinc oxide (IZO), zinc oxide (ZnO), indium zinc tin oxide (IZTO), and cadmium tin oxide (CTO).

According to some exemplary embodiments, the first mesh electrode layer and the second mesh electrode layer may be formed to include a metal layer. For example, the metal layer may include: one or more selected from a group consisting of silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), and alloys thereof (e.g., silver-palladium-copper (APC)).

According to some exemplary embodiments, the first mesh electrode layer and the second mesh electrode layer may include: a stacked structure of a transparent conductive oxide layer and a metal layer. For example, each of the first mesh electrode layer and the second mesh electrode layer may also have a three-layer structure of transparent conductive oxide layer-metal layer-transparent conductive oxide layer. In this case, it is possible to improve the flexible characteristic by the metal layer, to improve a signal delivery speed by reducing the resistance, and to improve corrosion resistance and transparency by the transparent conductive oxide layer.

A passivation layer covering the second mesh electrode layer may be formed on the insulating layer 50. The passivation layer is not especially limited as long as it may protect the electrode layer and the insulating film from the outside, and according to one or a plurality of exemplary embodiments, the passivation layer may include: an organic insulating material such as an epoxy-based resin, an acrylic-based resin, a siloxane-based resin, or a polyimide-based resin, or an inorganic insulating material such as silicon oxide or silicon nitride.

Figure 1B:
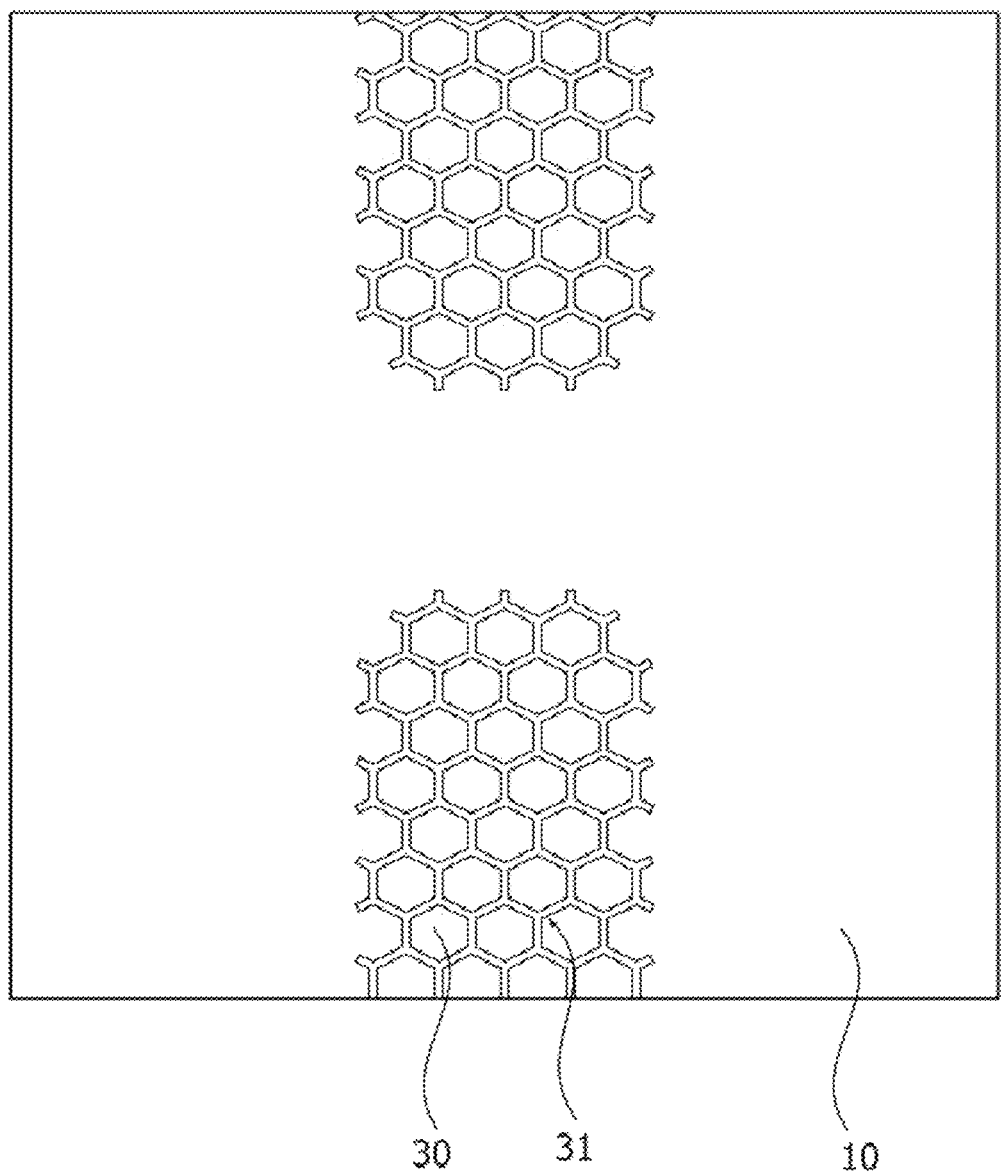
Figure 1C:
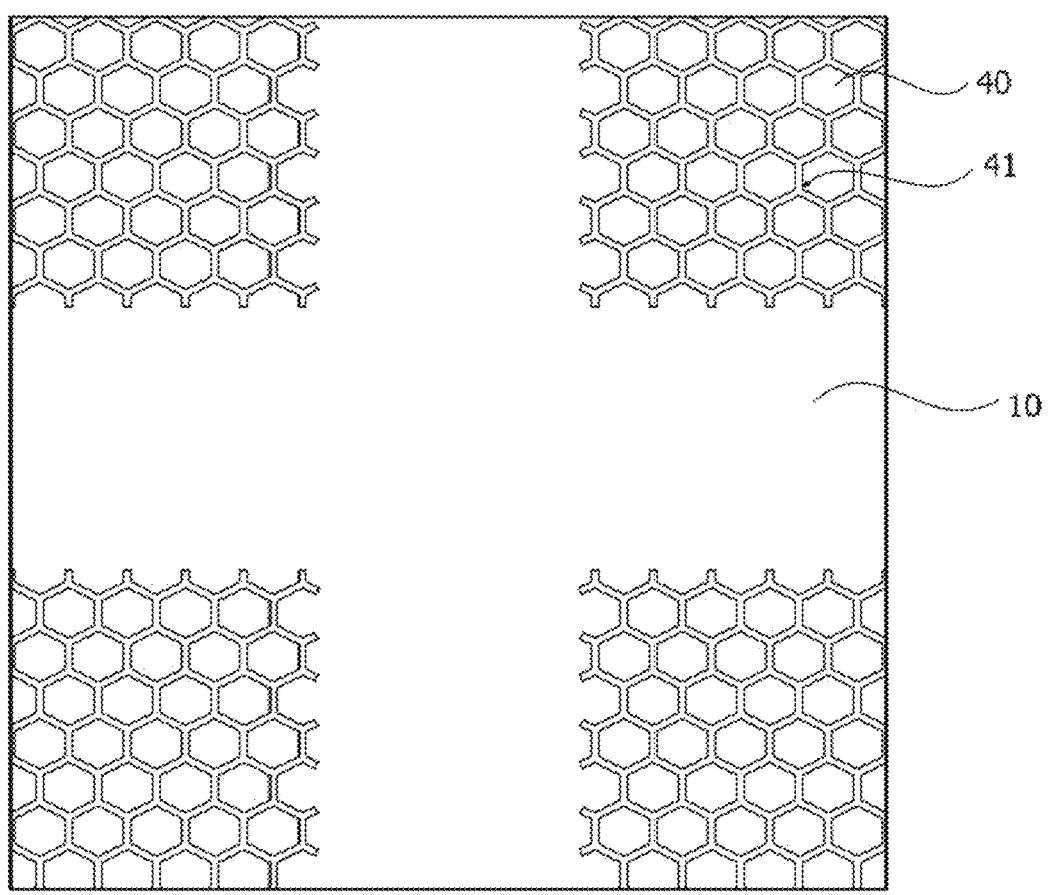
Figure 1D:
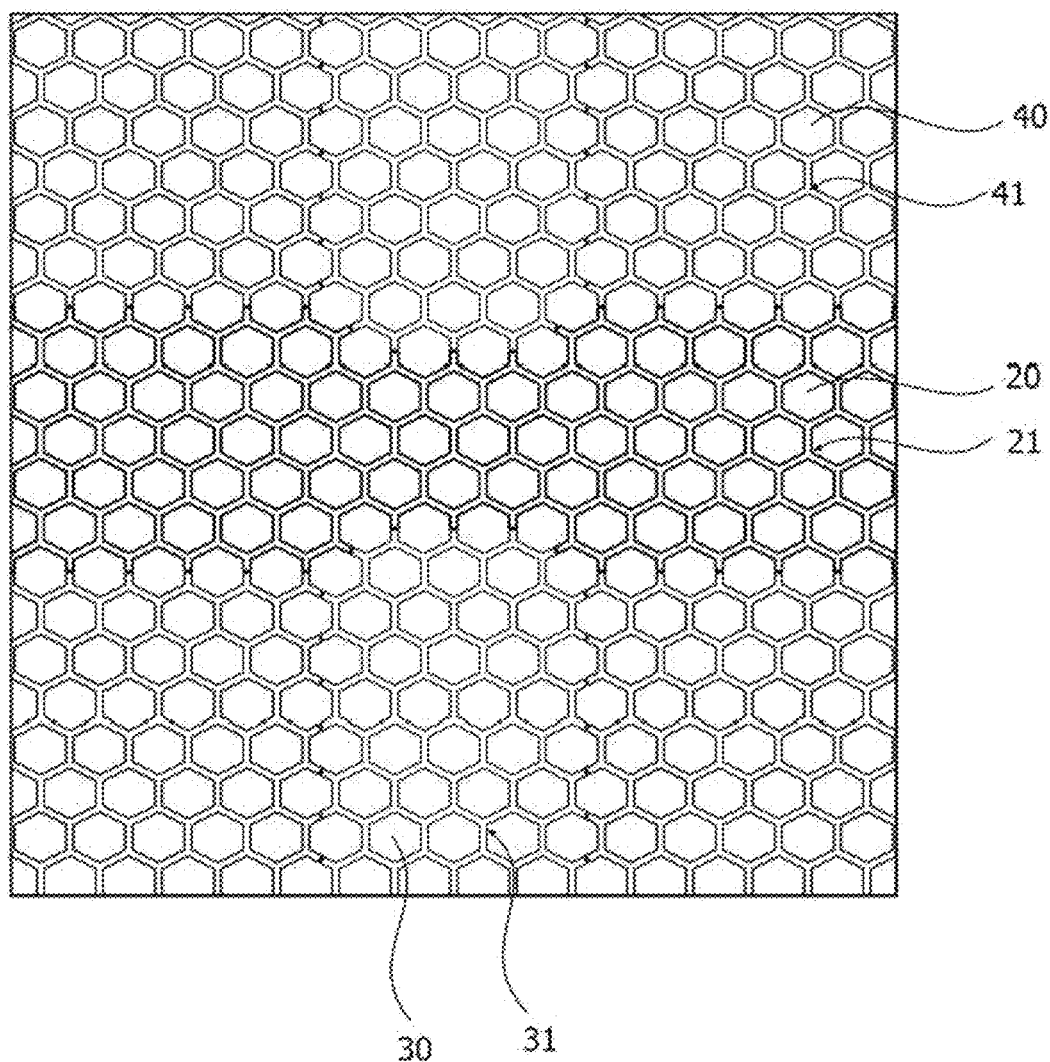

FIG. 1A is a plan diagram separately showing the first main electrode according to the exemplary embodiment of the present disclosure, FIG. 1B is a plan diagram separately showing the first auxiliary electrode according to the exemplary embodiment of the present disclosure, FIG. 1C is a plan diagram separately showing a first dummy electrode according to the exemplary embodiment of the present invention, and FIG. 1D is a plan diagram showing FIGS. 1A to 1C together.

Referring to FIG. 1A, the first main electrode may be formed on the base layer 10.

According to the exemplary embodiment, the first main electrode may include: a plurality of first main electrode unit patterns 20 that have through holes having a polygonal pattern shape such as a hexagonal shape and are regularly repeated, and an upper surface of the base layer 10 may be exposed through the through hole.

According to the exemplary embodiment, the plurality of first main electrode unit patterns 20 may be arranged in a row direction, and the adjacent first main electrode unit patterns 20 in the row direction may be physically and electrically connected to the first main electrode unit pattern 20 provided in a first connection part 22.

According to the exemplary embodiment, the plurality of first main electrode unit patterns 20 may be integrally connected by the first connection parts 22 to form the rows of the first main electrode unit patterns extending in the row direction. The plurality of rows of the first main electrode unit patterns may be arranged in a column direction.

The first main electrode unit pattern 20 may share the first main electrode intersecting point 21 with the adjacent first main electrode unit pattern 20 and be physically and electrically connected to the adjacent first main electrode unit pattern 20. The first main electrode intersecting point 21 may be defined by two or more adjacent first main electrode unit patterns 20.

Referring to FIG. 1B, the first auxiliary electrode may be formed on the base layer 10.

According to the exemplary embodiment, the first auxiliary electrode may be formed on a portion of the upper surface of the base layer 10 in which the first main electrode is not formed when viewed in a planar direction. The first auxiliary electrode may be formed around the first main electrode and formed to be spaced apart from the first main electrode.

According to the exemplary embodiment, the first auxiliary electrode may include: a plurality of first auxiliary electrode unit patterns 30 that have through holes having a polygonal pattern shape such as a hexagonal shape and are regularly repeated, and the upper surface of the base layer 10 may be exposed through the through hole.

The first auxiliary electrode unit pattern 30 may share the first auxiliary electrode intersecting point 31 with the adjacent first auxiliary electrode unit pattern 30 and be physically and electrically connected to the adjacent first auxiliary electrode unit pattern 30, and the first auxiliary electrode intersecting point 31 may be defined by two or more adjacent first auxiliary electrode unit patterns 30.

Referring to FIG. 1C, the first dummy electrode may be formed on the base layer 10.

According to the exemplary embodiment, the first dummy electrode may be formed on a portion of the upper surface of the base layer 10 in which the first main electrode and the first auxiliary electrode are not formed when viewed from the planar direction. The first dummy electrode may be formed around the first main electrode and the first auxiliary electrode, and formed to be spaced apart from the first main electrode and the first auxiliary electrode.

According to the exemplary embodiment, the first dummy electrode may include: a plurality of first dummy electrode unit patterns 40 that have through holes having a polygonal pattern shape such as a hexagonal shape and are regularly repeated, and the upper surface of the base layer 10 may be exposed through the through hole.

The first dummy electrode unit pattern 40 may share a first dummy electrode intersecting point 41 with the adjacent first dummy electrode unit pattern 40 and be physically and electrically connected to the adjacent first dummy electrode unit pattern 40, and the first dummy electrode intersecting point 41 may be defined by two or more adjacent first dummy electrode unit patterns 40. Each of some of the first dummy electrode unit patterns 40 may have a separate floating pattern shape.

The first unit pattern may include: the first main electrode unit pattern, the first auxiliary electrode unit pattern, and the first dummy electrode unit pattern described above, and the first intersecting point may include: the first main electrode intersecting point, the first auxiliary electrode intersecting point, and the first dummy electrode intersecting point.

Referring to FIG. 1D, as described above, the first mesh electrode layer may be formed to include the first main electrode, the first auxiliary electrode, and the first dummy electrode arranged on the upper surface of the base layer 10.

As shown in FIG. 1D, the first auxiliary electrode may be arranged to be spaced apart from the first main electrode by a constant spacing, and the first dummy electrode may be arranged adjacent to the first main electrode and the first auxiliary electrode.

According to the preferred exemplary embodiment, the first main electrode unit pattern, the first auxiliary electrode unit pattern, and the first dummy electrode unit pattern may have substantially the same size and shape, and some first intersecting points may be defined by different adjacent first unit patterns. In this case, the first mesh electrode layer may be substantially formed to include a single mesh-shaped pattern. In other words, the first unit pattern may be arranged on the upper surface of the base layer 10 in a regularly repeated structure, and may be uniformized in an array structure having the form of a spatial frequency including high-frequency components as a whole due to the aforementioned repeated structure.

The line width of the electrode pattern included in the first mesh electrode layer may be 10 to 100 µm, preferably, 10 to 70 µm, and more preferably, 10 to 50 µm. In this case, it is possible to improve the visibility and parasitic capacitance characteristics of the electrode pattern.

An aperture ratio of the first mesh electrode layer may be preferably 65 to 85%. In this case, it is possible to improve the transmittance of the electrode layer, and to improve the channel resistance characteristics and the sensitivity.

FIG. 2A is a plan diagram separately showing the second main electrode according to the exemplary embodiment of the present disclosure, FIG. 2B is a plan diagram separately showing the second auxiliary electrode according to the exemplary embodiment of the present disclosure, FIG. 2C is a plan diagram separately showing the second dummy electrode according to the exemplary embodiment of the present disclosure, and FIG. 2D is a plan diagram showing FIGS. 2A to 2C together.

Referring to FIG. 2A, the second main electrode may be formed on the insulating layer 50.

According to the exemplary embodiment, the second main electrode may include: a plurality of second main electrode unit patterns 60 that have through holes having a polygonal pattern shape such as a hexagonal shape and are regularly repeated, and the upper surface of the insulating layer 50 may be exposed through the through hole.

According to the exemplary embodiment, the plurality of second main electrode unit patterns 60 may be arranged in the column direction, and the adjacent second main electrode unit patterns 60 in the column direction may be physically and electrically connected to the second main electrode unit pattern 60 provided in a second connection part 62.

According to the exemplary embodiment, the plurality of second main electrode unit patterns 60 may be integrally connected by the second connection part 62 to form the columns of the second main electrode unit patterns extending in the column direction. The plurality of columns of the second main electrode unit patterns may be arranged in the row direction.

The second main electrode unit pattern 60 may share the second main electrode intersecting point 61 with the adjacent second main electrode unit pattern 60 and be physically and electrically connected to the adjacent second main electrode unit pattern 60, and the second main electrode intersecting point 61 may be defined by two or more adjacent second main electrode unit patterns 60.

Referring to FIG. 2B, the second auxiliary electrode may be formed on the insulating layer 50.

According to the exemplary embodiment, the second auxiliary electrode may be formed on a portion of the upper surface of the insulating layer 50 in which the second main electrode is not formed when viewed from the planar direction. The second auxiliary electrode may be formed around the second main electrode and formed to be spaced apart from the second main electrode.

According to the exemplary embodiment, the second auxiliary electrode may include: a plurality of second auxiliary electrode unit patterns 70 that have through holes having a polygonal pattern shape such as a hexagonal shape and are regularly repeated, and the upper surface of the insulating layer 50 may be exposed through the through hole.

The second auxiliary electrode unit pattern 70 may share the second auxiliary electrode intersecting point 71 with the adjacent second auxiliary electrode unit pattern 70 and be physically and electrically connected to the adjacent second auxiliary electrode unit pattern 70, and the second auxiliary electrode intersecting point 71 may be defined by two or more adjacent second auxiliary electrode unit patterns 70.

Referring to FIG. 2C, the second dummy electrode may be formed on the insulating layer 50.

According to the exemplary embodiment, the second dummy electrode may be formed on a portion of the upper surface of the insulating layer 50 in which the second main electrode and the second auxiliary electrode are not formed when viewed from the planar direction. The second dummy electrode may be formed around the second main electrode and the second auxiliary electrode, and formed to be spaced apart from the second main electrode and the second auxiliary electrode.

According to the exemplary embodiment, the second dummy electrode may include: a plurality of second dummy electrode unit patterns 80 that have through holes having a polygonal pattern shape such as a hexagonal shape and are regularly repeated. The upper surface of the insulating layer 50 may be exposed through the through hole.

The second dummy electrode unit pattern 80 may share a second dummy electrode intersecting point 81 with the adjacent second dummy electrode unit pattern 80 and be physically and electrically connected to the adjacent second dummy electrode unit pattern 80. The second dummy electrode intersecting point 81 may be defined by two or more adjacent second dummy electrode unit patterns 80. Each of some of the second dummy electrode unit patterns 80 may have a separate floating pattern shape.

The second unit pattern may include: the second main electrode unit pattern, the second auxiliary electrode unit pattern, and the second dummy electrode unit pattern described above, and the second intersecting point may include: the second main electrode intersecting point, the second auxiliary electrode intersecting point, and the second dummy electrode intersecting point described above.

Referring to FIG. 2D, as described above, the second mesh electrode layer may be formed to include: the second main electrode, the second auxiliary electrode, and the second dummy electrode arranged on the upper surface of the insulating layer 50.

As shown in FIG. 2D, the second auxiliary electrode may be arranged to be spaced apart from the second main electrode by a constant spacing, and the second dummy electrode may be arranged adjacent to the second main electrode and the second auxiliary electrode.

According to the preferred exemplary embodiment, the second main electrode unit pattern, the second auxiliary electrode unit pattern, and the second dummy electrode unit pattern may have substantially the same size and shape, and some second intersecting points may be defined by different adjacent second unit patterns. In this case, the second mesh electrode layer may be substantially formed to include: a single mesh-shaped pattern. In other words, the second unit pattern may be arranged on the upper surface of the insulating layer 50 in the regularly repeated structure, and may be uniformized in an array structure having the form of the spatial frequency including high-frequency components as a whole due to the aforementioned repeated structure.

The line width of the electrode pattern included in the second mesh electrode layer may be 10 to 100 μm, preferably, 10 to 70 μm, and more preferably, 10 to 50 μm. In this case, it is possible to improve the visibility and parasitic capacitance characteristics of the electrode pattern.

An aperture ratio of the second mesh electrode layer may be preferably 65 to 85%. In this case, it is possible to improve the transmittance of the electrode layer, and to improve the channel resistance characteristics and the sensitivity.

Referring to FIG. 3, the contact hole 90 may have two pairs of contact holes 90 for electrically connecting the first main electrode with the second auxiliary electrode, and five contact holes 90 for electrically connecting the second main electrode with the first auxiliary electrode formed at positions closest to the first connection part 22 and the second connection part 62.

According to some exemplary embodiments, the contact hole 90 may have a pair of contact holes 90 for electrically connecting the first main electrode with the second auxiliary electrode and a pair of contact holes 90 for electrically connecting the second main electrode with the first auxiliary electrode formed at positions closest to the first connection part 22 and the second connection part 62; and according to other exemplary embodiments, the contact hole 90 may be formed to be spaced apart from the first connection part 22 and the second connection part 62 by a constant spacing distance.

In addition to those shown in FIG. 3, the contact hole 90 may be formed on the insulating layer 50 in various shapes, and is not especially limited as long as it may electrically connect the first main electrode with the second auxiliary electrode, and the second main electrode with the first auxiliary electrode, thereby minimizing the parasitic capacitance and the channel resistance, and at least one contact hole 90 is preferably formed.

The contact hole 90 is preferably formed at a point where the first intersecting point and the second intersecting point overlap in the planar direction in terms of process economic feasibility, the conductivity and detection strength of the touch sensor, etc. According to the exemplary embodiment, it is preferable that the contact hole 90 is formed at a point where the first main electrode intersecting point and the second auxiliary electrode intersecting point opposite thereto overlap in the planar direction and/or a point where the second main electrode intersecting point and the first auxiliary electrode intersecting point opposite thereto overlap in the planar direction.

According to the exemplary embodiment, the contact hole 90 may have a square shape indicating the size of 30 μm×30 μm, but is not especially limited thereto, and is not especially limited as long as it may electrically connect the first mesh electrode layer with the second mesh electrode layer.

The contact hole 90 serves to electrically connect the first mesh electrode layer with the second mesh electrode layer, and specifically, to electrically connect the first main electrode with the second auxiliary electrode, and the second main electrode with the first auxiliary electrode so that the first main electrode and the second auxiliary electrode, and the second main electrode and the first auxiliary electrode form the equipotential, respectively, thereby improving the resistance of the electrode channel as well as suppressing the generation of the parasitic capacitance.

Specifically, FIG. 4 is a plan diagram in which the first mesh electrode layer shown in FIG. 1D, the second mesh electrode layer shown in FIG. 2D, and the insulating layer 50 shown in FIG. 3 are projected together in the planar direction.

The touch sensor according to the present disclosure may adjust the aperture ratio of the entire electrode layer according to the arrangement of the first mesh electrode layer and the second mesh electrode layer, thereby improving the visibility of the electrode pattern as well as improving the transmittance of the touch sensor. The aperture ratio of the entire electrode layer including:the first mesh electrode layer and the second mesh electrode layer may be appropriately selected by the user according to the arrangement of the first mesh electrode layer and the second mesh electrode layer, but may be preferably 40 to 75% in terms of improving the transmittance of the touch sensor.

Specifically, referring to FIG. 4, at least one of the first unit patterns may include: the second intersecting point in the planar direction, and at least one of the second unit patterns may include: the first intersecting point in the planar direction. By arranging the mesh patterns of the first mesh electrode layer and the second mesh electrode layer as described above, the electrode pattern of each electrode layer may be arranged in a form that does not overlap between the patterns, and uniformized in an array structure having the form of the spatial frequency including high-frequency components as a whole, thereby further improving the visibility of the electrode pattern.

More specifically, the first main electrode unit pattern 20 may include: the second auxiliary electrode intersecting point 71 in the planar direction. According to the exemplary embodiment, an area of the circle that uses, as a radius, a distance from the second auxiliary electrode intersecting point 71 included in the first main electrode unit pattern 20 to the center portion of the first main electrode unit pattern 20 may be 10% or less of an area of the first main electrode unit pattern 20 in the planar direction, and more preferably, the second auxiliary electrode intersecting point 71 may be positioned on the center portion of the first main electrode unit pattern 20 in the planar direction.

The second main electrode unit pattern 60 may include: the first auxiliary electrode intersecting point 31 in the planar direction. According to the exemplary embodiment, an area of the circle that uses, as a radius, a distance from the first auxiliary electrode intersecting point 31 included in the second main electrode unit pattern 60 to the center portion of the second main electrode unit pattern 60 may be 10% or less of an area of the second main electrode unit pattern 20 in the planar direction, and more preferably, the first auxiliary electrode intersecting point 31 may be positioned on the center portion of the second main electrode unit pattern 60 in the planar direction.

The first auxiliary electrode unit pattern 30 may include: the second main electrode intersecting point 61 in the planar direction. According to the exemplary embodiment, an area of the circle that uses, as a radius, a distance from the second main electrode intersecting point 61 included in the first auxiliary electrode unit pattern 30 to the center portion of the first auxiliary electrode unit pattern 30 may be 10% or less of an area of the first auxiliary electrode unit pattern 30 in the planar direction, and more preferably, the second main electrode intersecting point 61 may be positioned on the center portion of the first auxiliary electrode unit pattern 30 in the planar direction.

The second auxiliary electrode unit pattern 70 may include: the first main electrode intersecting point 21 in the planar direction. According to the exemplary embodiment, an area of the circle that uses, as a radius, a distance from the first main electrode intersecting point 21 included in the second auxiliary electrode unit pattern 70 to the center portion of the second auxiliary electrode unit pattern 70 may be 10% or less of an area of the second auxiliary electrode unit pattern 70 in the planar direction, and more preferably, the first main electrode intersecting point 21 may be positioned on the center portion of the second auxiliary electrode unit pattern 70 in the planar direction.

The first main electrode unit pattern 20 formed on the first connection part 22 may include: the second main electrode intersecting point 61 in the planar direction. According to the exemplary embodiment, an area of the circle that uses, as a radius, a distance from the second main electrode intersecting point 61 included in the first main electrode unit pattern 20 to the center portion of the first main electrode unit pattern 20 may be 10% or less of an area of the first main electrode unit pattern 20 in the planar direction, and more preferably, the second main electrode intersecting point 61 may be positioned on the center portion of the first main electrode unit pattern 20 in the planar direction.

The second main electrode unit pattern 60 formed on the second connection part 62 may include: the first main electrode intersecting point 21 in the planar direction. According to the exemplary embodiment, an area of the circle that uses, as a radius, a distance from the first main electrode intersecting point 21 included in the second main electrode unit pattern 60 to the center portion of the second main electrode unit pattern 60 may be 10% or less of an area of the second main electrode unit pattern 60 in the planar direction, and more preferably, the first main electrode intersecting point 21 may be positioned on the center portion of the second main electrode unit pattern 60 in the planar direction.

The first dummy electrode unit pattern 40 may include: the second dummy electrode intersecting point 81 in the planar direction. According to the exemplary embodiment, an area of the circle that uses, as a radius, a distance from the second dummy electrode intersecting point 81 included in the first dummy electrode unit pattern 40 to the center portion of the first dummy electrode unit pattern 40 may be 10% or less of an area of the first dummy electrode unit pattern 40 in the planar direction, and more preferably, the second dummy electrode intersecting point 81 may be positioned on the center portion of the first dummy electrode unit pattern 40 in the planar direction.

The second dummy electrode unit pattern 80 may include: the first dummy electrode intersecting point 41 in the planar direction. According to the exemplary embodiment, an area of the circle that uses, as a radius, a distance from the first dummy electrode intersecting point 41 included in the second dummy electrode unit pattern 80 to the center portion of the second dummy electrode unit pattern 80 may be 10% or less of an area of the second dummy electrode unit pattern 80 in the planar direction, and more preferably, the first dummy electrode intersecting point 41 may be positioned on the center portion of the second dummy electrode unit pattern 80 in the planar direction.

The contact hole 90 may have two pairs of contact holes 90 for electrically connecting the first main electrode with the second auxiliary electrode, and five contact holes 90 for electrically connecting the second main electrode with the first auxiliary electrode formed.

Specifically, the contact hole 90 may include: two pairs of contact holes 90 formed at the positions closest to the first connection part 22 and the second connection part 62 among the points where the first main electrode intersecting point 21 and the second auxiliary electrode intersecting point 71 intersect in the planar direction, and five contact holes 90 formed at the positions closest to the first connection part 22 and the second connection part 62 among the points where the second main electrode intersecting point 61 and the first auxiliary electrode intersecting point 31 intersect in the planar direction.

The contact hole does not necessarily have to be formed with regularity, and is not especially limited as long as it may electrically connect the first main electrode and the second auxiliary electrode, and the second main electrode and the first auxiliary electrode, thereby minimizing the parasitic capacitance and the channel resistance.

Figure 5A:
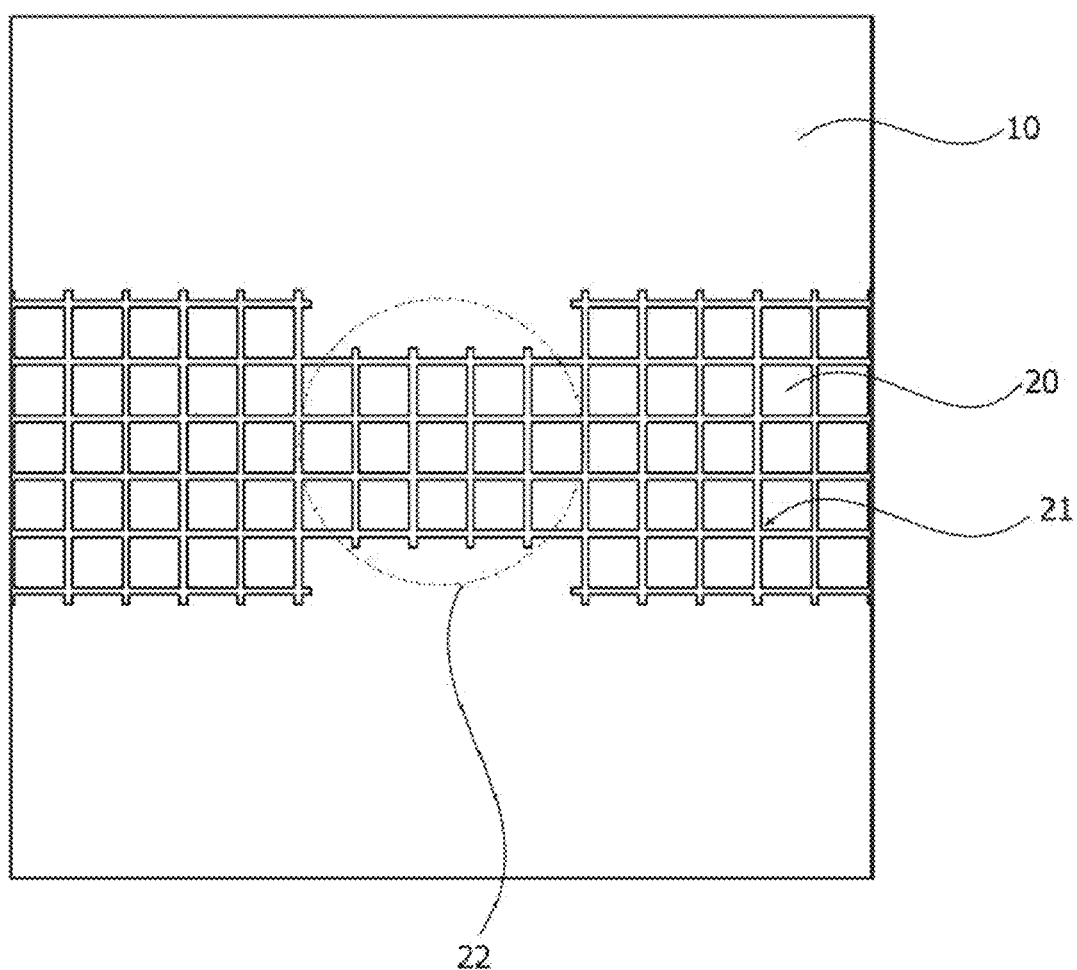
FIGS. 5A-5D are schematic plan diagrams showing a first mesh electrode layer according to another exemplary embodiment of the present disclosure.
Figure 5B:
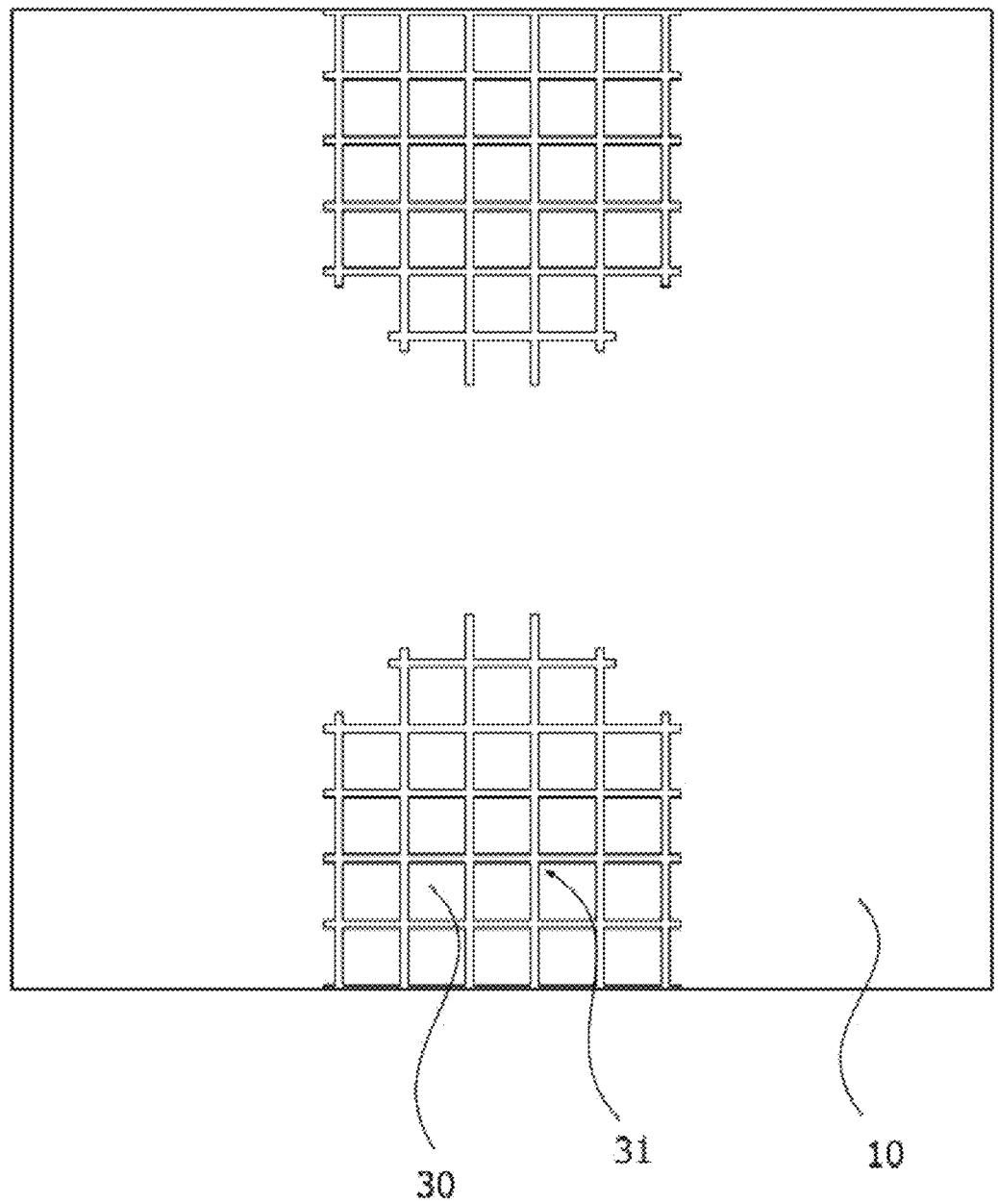
Figure 5C:
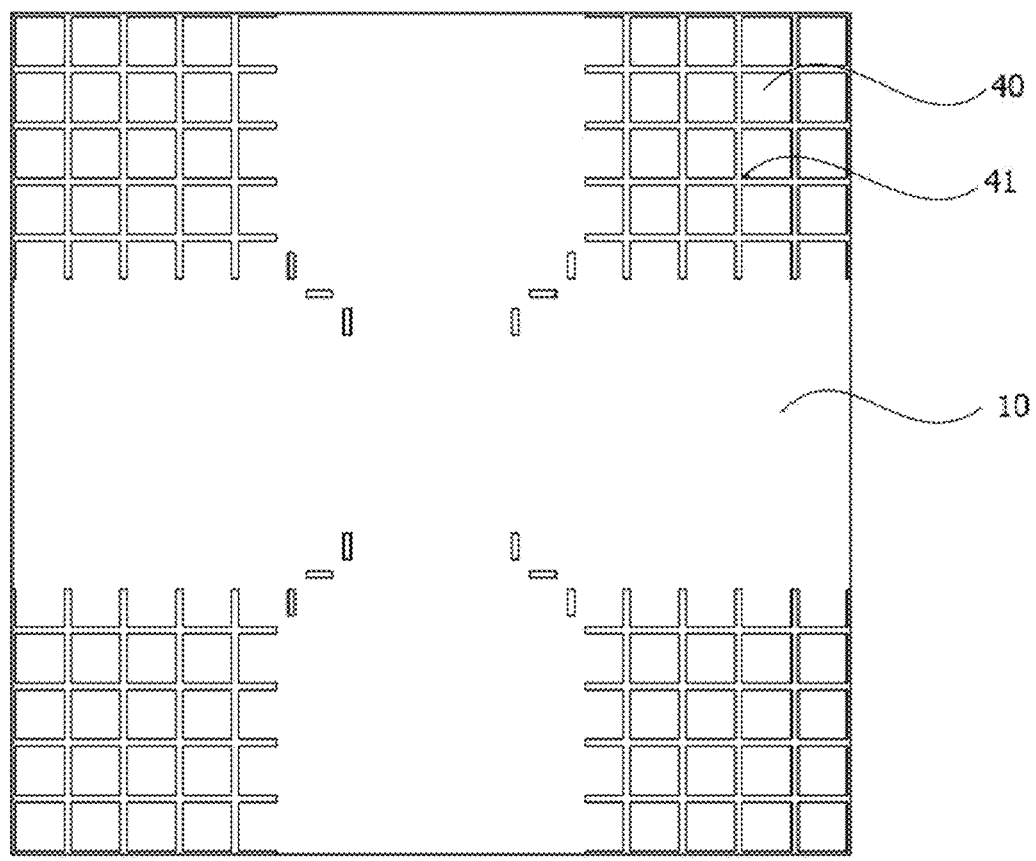
Figure 5D:
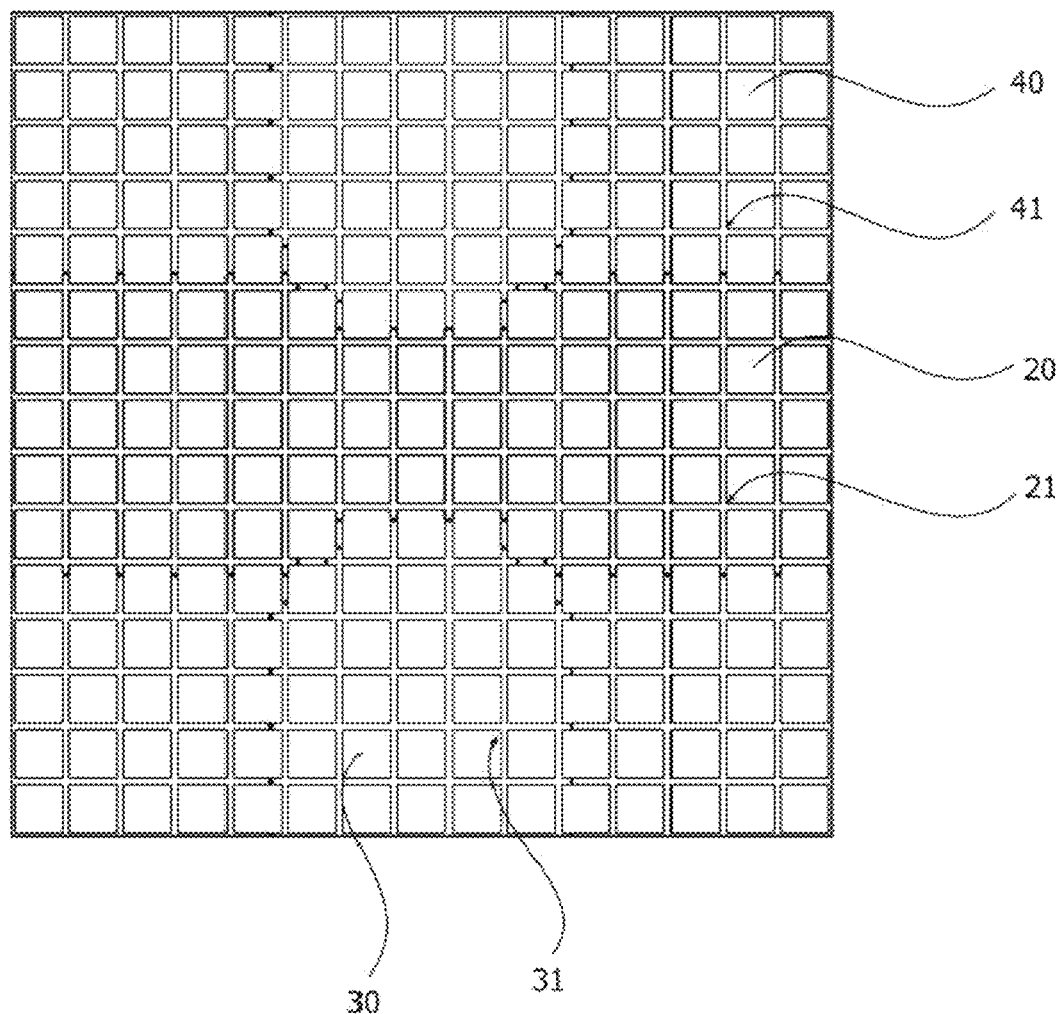

FIG. 5A is a plan diagram separately showing a first main electrode according to another exemplary embodiment of the present disclosure, FIG. 5B is a plan diagram separately showing a first auxiliary electrode according to another exemplary embodiment of the present disclosure, FIG. 5C is a plan diagram separately showing a first dummy electrode according to another exemplary embodiment of the present disclosure, and FIG. 5D is a plan diagram showing FIGS. 5A to 5C together.

FIG. 6A is a plan diagram separately showing a second main electrode according to another exemplary embodiment of the present disclosure, FIG. 6B is a plan diagram separately showing a second auxiliary electrode according to another exemplary embodiment of the present disclosure, FIG. 6C is a plan diagram separately showing a second dummy electrode according to another exemplary embodiment of the present disclosure, and FIG. 6D is a plan diagram showing FIGS. 6A to 6C together.

Specifically, FIG. 8 is a plan diagram in which the first electrode layer shown in FIG. 5D, the second electrode layer shown in FIG. 6D, and the insulating layer 50 shown in FIG. 7 are projected together in the planar direction.

Referring to FIGS. 5 to 8, a touch sensor according to another exemplary embodiment of the present disclosure may include: the plurality of first main electrode unit patterns 20, first auxiliary electrode unit patterns 30, first dummy electrode unit patterns 40, second main electrode unit patterns 60, second auxiliary electrode unit patterns 70, and second dummy electrode unit patterns 80, which have the through holes having a polygonal pattern shape such as a rectangular shape and are regularly repeated.

Each element included in the touch sensor according to another exemplary embodiment of the present disclosure may satisfy all of the aforementioned characteristics, and represent substantially the same characteristics.

Figure 9:
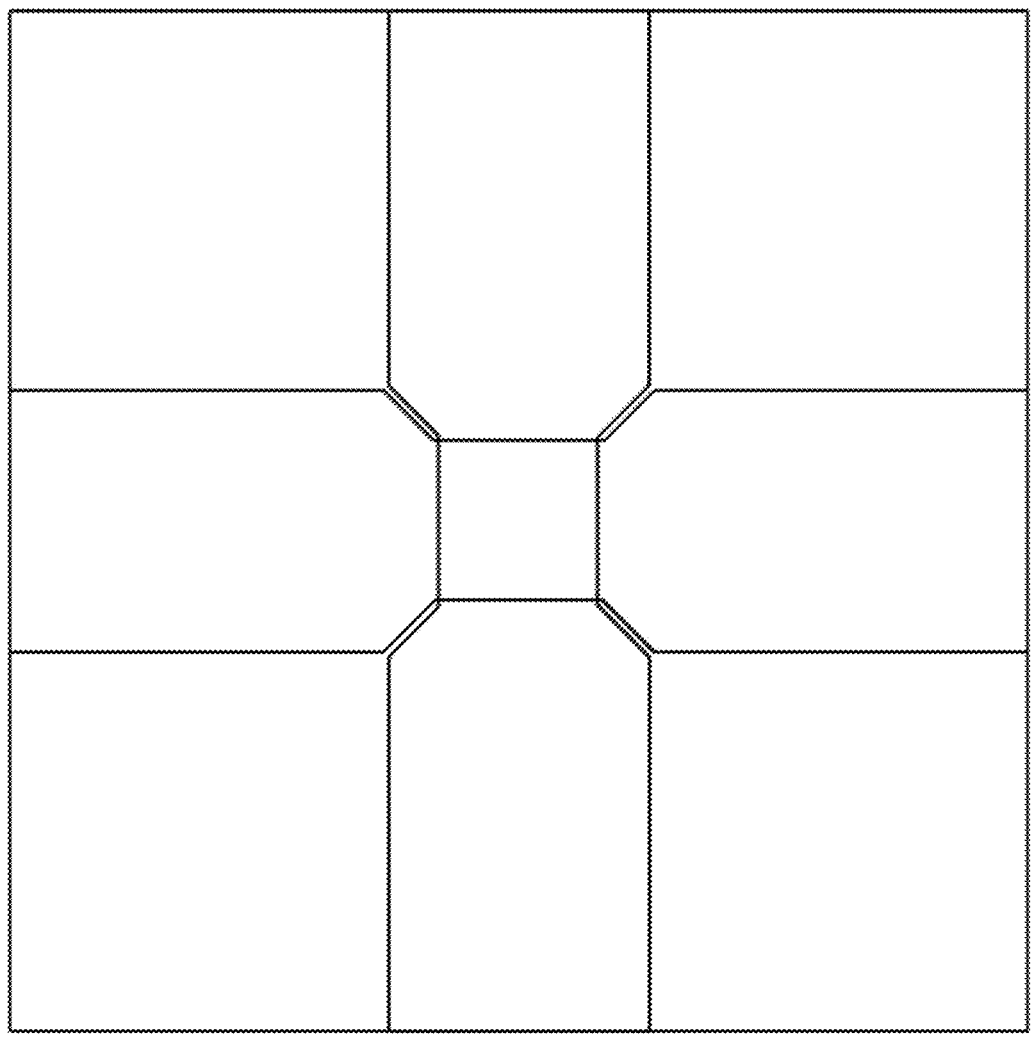
FIG. 9 is a schematic plan diagram showing a touch sensor according to a Comparative Example of the present disclosure.
Figure 10:
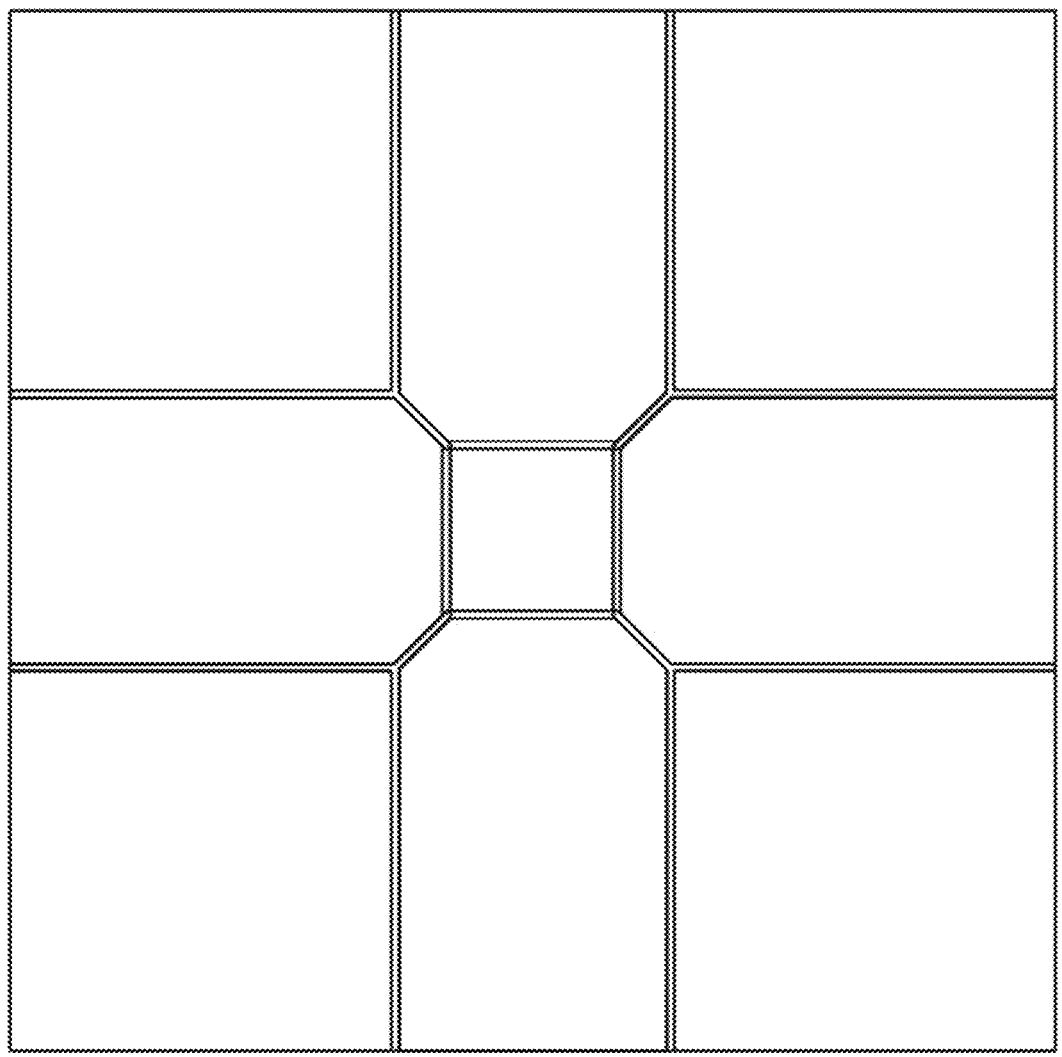
FIG. 10 is a schematic plan diagram showing a touch sensor according to another Comparative Example of the present disclosure.

FIG. 9 is a schematic plan diagram showing a touch sensor according to a Comparative Example of the present disclosure, and FIG. 10 is a schematic plan diagram showing a touch sensor according to another Comparative Example of the present disclosure.

Referring to FIG. 9, a touch sensor according to a Comparative Example of the present disclosure may not include the dummy electrode and the contact hole, and the electrode layer may not include the mesh-shaped electrode pattern either. In this case, the transparent electrode is visually recognized by the user due to the optical difference of the electrode layer, and if the thickness of the insulating layer is reduced to reduce the thickness of the touch sensor, the capacitance between the electrodes in the overlapping region may increase, thereby reducing the touch sensitivity.

Referring to FIG. 10, a touch sensor according to another Comparative Example of the present disclosure may include: the dummy electrode, but not include the contact hole, and the electrode layer may not include the mesh-shaped electrode pattern either. In this case, the transmit-tance of each electrode layer may be reduced because the overlapping region of the electrode layers increases.

Therefore, the present disclosure is technically characterized in that each electrode layer includes the mesh-shaped electrode pattern having the aperture ratio of a certain level or more, and each electrode pattern has a predetermined arrangement. As described above, there is an advantage in that each electrode layer may include the mesh-shaped electrode pattern having the aperture ratio of the certain level or more, thereby improving the transmittance of each electrode layer, and may appropriately adjust the arrangement of each electrode pattern, thereby reducing the pattern visibility, etc.

According to the exemplary embodiment of the present disclosure, by forming the base layer, forming the first mesh electrode layer on the base layer, forming the insulating layer including the contact hole on the first mesh electrode layer, and forming the second mesh electrode layer on the insulating layer, the first mesh electrode layer and the second mesh electrode layer are arranged on different layers with the insulating layer interposed therebetween, and the first main electrode and the second auxiliary electrode, and the second main electrode and the first auxiliary electrode are electrically connected, respectively.

According to the exemplary embodiment of the present disclosure, it is possible to omit the bridge electrode, thereby improving the phenomenon in which the bridge electrode is visually recognized.

In addition, the first mesh electrode layer and the second mesh electrode layer are arranged in the planar direction, preferably, so that the second intersecting point and the first intersecting point are formed on the center portions of the first unit pattern and the second unit pattern, thereby improving the phenomenon in which the electrode is visually recognized.

Specifically, the human visual recognition characteristic represents the human recognition (distinguishing) ability and contrast, and may be expressed as a spatial frequency. The contrast refers to an intensity difference between the tone of a certain portion of an image and the tone of another portion thereof, and the strong contrast of the image means that the difference between the light and dark levels of a specific image is larger than a normal case. In the visibility of the electrode pattern, as the contrast is increased, that is, as the intensity difference between these tones is revealed more clearly, the distinguishing ability according to the human visual recognition characteristic increases in a proportional relationship. In other words, it may be seen that the distinguishing ability for the contrast according to the human visual recognition characteristic may not be expressed as a single function of the spatial frequency, and the distinguishing ability is rather reduced in the highest frequency region and the lowest frequency region of the spatial frequency.

Using these characteristics, according to the present disclosure, when the touch sensor is observed in the planar direction, it is possible to substantially remove the irregularity of the patterns and to uniformize the upper surface of the touch sensor by the high-frequency components not visually recognized by the user, thereby improving the phenomenon in which the electrode is visually recognized.

In addition, it is possible to include the mesh-shaped electrode pattern, thereby suppressing the parasitic capacitance due to the arrangement of the electrode layer in the thickness direction, and to include the contact hole for electrically connecting the first mesh electrode layer with the second mesh electrode layer in the insulating layer, thereby minimizing the parasitic capacitance and the resistance of the electrode channel compared to the touch sensor not including the contact hole to implement the ultra-thin type touch sensor.

Meanwhile, the shapes of the electrode pattern, the unit pattern, and the intersecting point are not limited to those shown in FIGS. 1 to 8, and may be modified and used in various shapes according to the user's needs.

Image Display Device

The present disclosure provides an image display device including the touch sensor.

The image display device may include a display panel and the aforementioned touch sensor coupled to the display panel.

The display panel may include: a pixel electrode, a pixel defining film, a display layer, a counter electrode, an encapsulation layer, etc., which are arranged on a panel substrate.

A pixel circuit including a thin film transistor (TFT) may be formed on the panel substrate, and an insulating layer covering the pixel circuit may be formed. The pixel electrode may be electrically connected to, for example, a drain electrode of the TFT on the insulating layer.

The pixel defining film may be formed on the insulating layer to expose the pixel electrode to define a pixel region. The display layer may be formed on the pixel electrode, and the display layer may include, for example, a liquid crystal layer or an organic light emitting layer.

The counter electrode may be arranged on the pixel defining film and the display layer. The counter electrode may be provided as, for example, a common electrode or a cathode of the image display device. The encapsulation layer for protecting the display panel may be stacked on the counter electrode.

According to some exemplary embodiments, the display panel and the touch sensor may also be coupled through an adhesive layer. For example, the adhesive layer may have a viscoelasticity of about 0.2 MPa or less at −20 to 80° C. In this case, it is possible to shield the noise from the display panel, and to relieve interfacial stress during bending, thereby suppressing damage to the touch sensor. According to the exemplary embodiment, the viscoelasticity may be about 0.01 to 0.15 MPa.

The image display device may be inserted or mounted into an optical imaging device such as VR equipment, and the aforementioned pixel unit and pixel circuit may be substantially concealed through the holes formed in the touch sensor. Therefore, only desired images may be collected, edited, and modified through the optical imaging device.

Hereinafter, examples of the present disclosure will be specifically described. However, the present disclosure is not limited to the examples disclosed below, but may be implemented in various different forms, and only these examples allow the disclosure of the present disclosure to be complete, and are provided to fully inform those skilled in the art to which the present disclosure pertains of the scope of the disclosure, and the present disclosure may be defined only by the scope of claims.

EXAMPLE AND COMPARATIVE EXAMPLE

Example 1

A first mesh electrode layer was formed by forming a first transparent electrode layer (transmittance: 84.8% and sheet resistance: 9Ω) on a PET substrate having the thickness of 40 μm, and patterning it to have the same electrode pattern as shown in FIG. 1D (line width: 35 μm, pitch of a unit pattern: 287 μm×430 μm, and aperture ratio: 75%). Thereafter, an insulating layer having the thickness of 2 μm covering the first mesh electrode layer was applied on the substrate, and the contact hole of 30 μm×30 μm was formed in the same shape as shown in FIG. 3. Next, a second mesh electrode layer was formed by forming a second transparent electrode layer (transmittance: 84.1% and sheet resistance: 9Ω) on the insulating layer, and patterning it to have the same electrode pattern as shown in FIG. 2D (line width: 35 μm, pitch of the unit pattern: 287 μm×430 μm, and aperture ratio: 75%). Thereafter, the touch sensor (entire aperture ratio: 54%) according to Example 1 was produced by forming a passivation layer covering the second mesh electrode layer on the insulating layer.

Comparative Example 1

As shown in FIG. 9, the touch sensor according to Comparative Example 1 was produced in the same manufacturing method as in Example 1, except that the auxiliary electrode, the dummy electrode, and the contact hole were not included, and the mesh-shaped electrode pattern was not included.

Comparative Example 2

As shown in FIG. 10, the touch sensor according to Comparative Example 2 was produced in the same manufacturing method as in Example 1, except that the dummy electrode was included, but the contact hole was not included, and the mesh-shaped electrode pattern was not included.

Experimental Example

Pattern Visibility Evaluation

For the touch sensors according to Example and Comparative Examples, the reflective pattern visibility was visually evaluated under the light source conditions of the 3-wavelength lamp, and the results thereof are shown in Table 1 below.

Pattern Visibility Evaluation Criteria

○: Excellent pattern visibility
Δ: Normal pattern visibility
X: Poor pattern visibility Transmittance Evaluation For the touch sensors according to Example and Comparative Examples, transmittance was evaluated by using CM-3600 from Minolta, and the results thereof are shown in Table 1 below.

Capacitance Evaluation

For the touch sensors according to Example and Comparative Examples, the capacitance was evaluated through simulation using Q3D from Ansys, and the results thereof are shown in Table 1 below.

Channel Resistance Evaluation

For the touch sensors according to Example and Comparative Examples, the channel resistance was evaluated by the resistance simulation and the multimeter measuring instrument using Q3D from Ansys, and the results thereof are shown in Table 1 below.

TABLE 1

| Items | Example 1 | Comparative Example 1 | Comparative Example 2 |
|---|---|---|---|
| Pattern visibility | ○ | X | Δ |
| Transmittance | 88% | 88.4% | Less than 80% |
| Capacitance | 0.85 pF | 5.08 pF | 4.59 pF |
| Resistance [Ω] | 141.09 H | 45.17 H | 45.17 H |
| | 189.83 V | 69.09 V | 69.09 V |

Referring to the contents of Table 1, for the touch sensor according to Comparative Example 1, the patterns of the first transparent electrode layer and the second transparent electrode layer were strongly recognized. In addition, since the capacitance value between the first and second electrodes is too high, sensitivity is reduced during operation of the touch sensor. (A normal capacitive touch sensor has the level of 1 pF or less.)

It may be seen that if the dummy electrode was added as in the touch sensor according to Comparative Example 2, the pattern visibility was partially improved, but the capacitance was excessively high as in Comparative Example 1, thereby reducing the touch sensitivity and reducing the transmittance.

It could be seen that the touch sensor according to Example showed excellent characteristics in the pattern visibility, the transmittance, and the sensitivity. In addition, the portion where the resistance is increased by the mesh pattern may connect the main electrode and the auxiliary electrode of each layer through the contact hole, thereby obtaining the compensation effect.

What is claimed is:

1. A touch sensor comprising:
  a first mesh electrode layer comprising: first unit patterns and a first intersecting point;
  a second mesh electrode layer comprising: second unit patterns and a second intersecting point; and
  an insulating layer positioned between the first mesh electrode layer and the second mesh electrode layer and provided with a contact hole,
  wherein at least one of the first unit patterns comprises: the second intersecting point in a planar direction,
  wherein at least one of the second unit patterns comprises: the first intersecting point in the planar direction,
  wherein the first mesh electrode layer comprises: a first main electrode and a first auxiliary electrode formed to be spaced apart from the first main electrode,
  wherein the second mesh electrode layer comprises: a second main electrode and a second auxiliary electrode formed to be spaced apart from the second main electrode,
  wherein an aperture ratio of the first mesh electrode layer is 65 to 85% and an aperture ratio of the second mesh electrode layer is 65 to 85%,
  wherein a pattern line width of the first mesh electrode layer and the second mesh electrode layer is 10 to 50 μm,
  wherein an aperture ratio of the entire electrode layer including the first mesh electrode layer and the second mesh electrode layer is 40 to 75%,
  wherein the contact hole is to electrically connect at least one of the first main electrode and the second auxiliary electrode opposite thereto; and the second main electrode and the first auxiliary electrode opposite thereto, and
  wherein the contact hole is formed on at least one of a point where a first main electrode intersecting point and a second auxiliary electrode intersecting point opposite thereto overlap in the planar direction; and a point where a second main electrode intersecting point and a first auxiliary electrode intersecting point opposite thereto overlap in the planar direction.

2. The touch sensor of claim 1, wherein at least one of the first mesh electrode layer and the second mesh electrode layer comprises: a transparent conductive electrode material.

3. The touch sensor of claim 2, wherein the transparent conductive electrode material has the transmittance of 80% or more.

4. The touch sensor of claim 2, wherein the transparent conductive electrode material comprises: one or more selected from a group consisting of indium tin oxide (ITO), indium zinc oxide (IZO), zinc oxide (ZnO), indium zinc tin oxide (IZTO), and cadmium tin oxide (CTO).

5. The touch sensor of claim 2, wherein the transparent conductive electrode material has a stacked structure of transparent conductive oxide layer-metal layer-transparent conductive oxide layer.

6. The touch sensor of claim 5, wherein the metal layer comprises: one or more selected from a group consisting of silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), and an alloy thereof.

7. The touch sensor of claim 1, wherein an area of a circle that uses, as a radius, a distance from the second intersecting point comprised in the first unit pattern to the center portion of the first unit pattern is 10% or less of an area of the first unit pattern in the planar direction.

8. The touch sensor of claim 1, wherein an area of a circle that uses, as a radius, a distance from the first intersecting point comprised in the second unit pattern to the center portion of the second unit pattern is 10% or less of an area of the second unit pattern in the planar direction.

9. The touch sensor of claim 1,
  wherein the first main electrode comprises: a first connection part connecting the first main electrode in a row direction, and
  wherein the second main electrode comprises: a second connection part connecting the second main electrode in a column direction.

10. The touch sensor of claim 1,
  wherein the first mesh electrode layer comprises: a first dummy electrode formed to be spaced apart from the first main electrode and the first auxiliary electrode, and
  wherein the second mesh electrode layer comprises: a second dummy electrode formed to be spaced apart from the second main electrode and the second auxiliary electrode.

11. An image display device comprising:
  a display panel; and
  a touch sensor of claim 1 stacked on the display panel.

* * * * *